(12) United States Patent
Horn et al.

(10) Patent No.: US 12,101,214 B2
(45) Date of Patent: Sep. 24, 2024

(54) COMPRESSED CHANNEL AWARE TONE RESERVATION SIGNALING FOR PEAK-TO-AVERAGE POWER RATIO REDUCTION

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Amit Bar-Or Tillinger, Tel-Aviv (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 17/342,953

(22) Filed: Jun. 9, 2021

(65) Prior Publication Data
US 2022/0400042 A1  Dec. 15, 2022

(51) Int. Cl.
| | |
|---|---|
| H04L 27/26 | (2006.01) |
| H04L 5/00 | (2006.01) |
| H04L 25/02 | (2006.01) |
| H04W 24/08 | (2009.01) |
| H04W 28/06 | (2009.01) |

(52) U.S. Cl.
CPC ........ *H04L 27/2614* (2013.01); *H04L 5/0048* (2013.01); *H04L 25/0228* (2013.01); *H04W 24/08* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 2016/0219570 A1* | 7/2016 | Guo | ..................... | H04W 72/046 |
| 2019/0357264 A1* | 11/2019 | Yi | ......................... | H04L 1/1819 |
| 2021/0219161 A1* | 7/2021 | Hu | ......................... | H04W 24/08 |
| 2022/0278882 A1* | 9/2022 | Back | ................... | H04L 27/2614 |
| 2023/0027512 A1* | 1/2023 | Cirik | ..................... | H04L 5/0023 |

* cited by examiner

*Primary Examiner* — Walter J Divito
(74) *Attorney, Agent, or Firm* — Procopio, Cory, Hargreaves & Savitch LLP

(57) ABSTRACT

Aspects presented herein may enable a transmitting device, such as a base station, to compress tone reservation signaling for PAPR reduction, such that the transmitting device may indicate to a receiving device the location of reserved tones and data tones of a transmission with a small payload. In one aspect, a base station estimates an UL channel based on one or more SRSs from a UE, the estimated UL channel corresponding to a DL channel. The base station selects a plurality of TR locations associated with at least one of the DL channel or the UL channel. The base station transmits, to the UE, an indication of the plurality of TR locations associated with at least one of the DL channel or the UL channel.

28 Claims, 25 Drawing Sheets

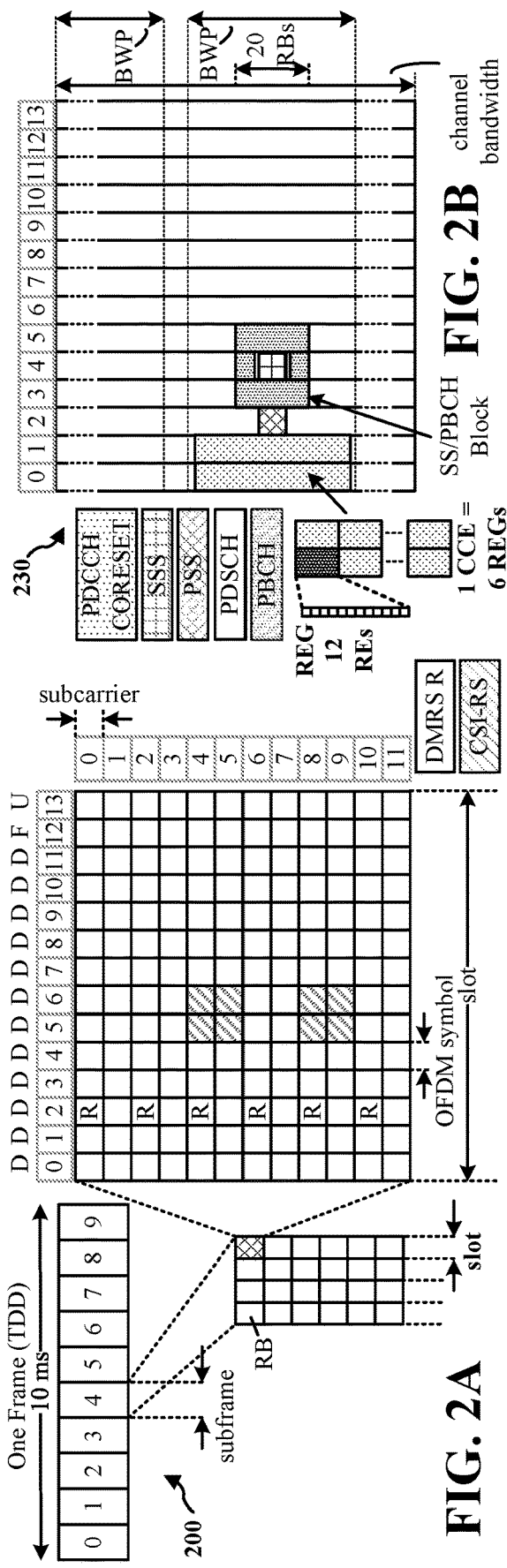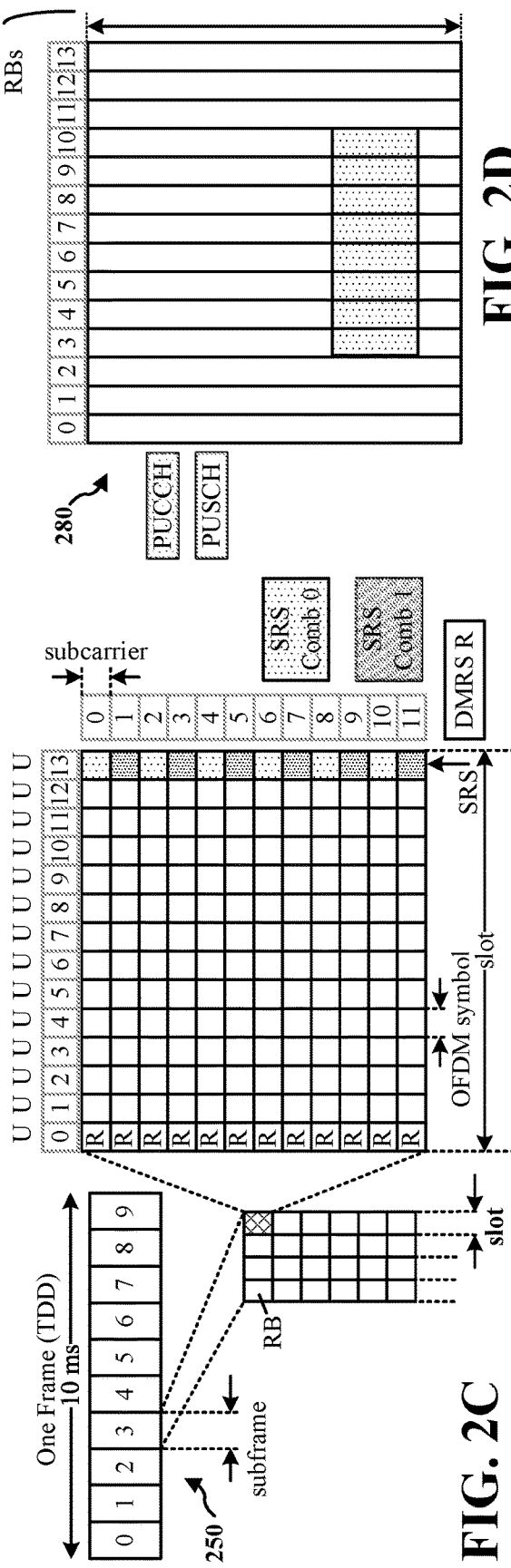
FIG. 2A
FIG. 2B
FIG. 2C
FIG. 2D

COMPRESSED CHANNEL AWARE TONE RESERVATION SIGNALING FOR PEAK-TO-AVERAGE POWER RATIO REDUCTION

TECHNICAL FIELD

The present disclosure relates generally to communication systems, and more particularly, to wireless communication involving peak-to-average power ratio (PAPR) reduction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus estimates an uplink (UL) channel based on one or more sounding reference signals (SRSs) from a user equipment (UE), the estimated UL channel corresponding to a downlink (DL) channel. The apparatus selects a plurality of tone reservation (TR) locations associated with at least one of the DL channel or the UL channel. The apparatus transmits, to the UE, an indication of the plurality of TR locations associated with at least one of the DL channel or the UL channel.

In an aspect of the disclosure, a method, a computer-readable medium, and an apparatus are provided. The apparatus receives, from a base station, an indication of a plurality of TR locations associated with at least one of a DL channel or an UL channel. The apparatus calculates, based on the indication, the plurality of TR locations associated with the at least one of the DL channel or the UL channel. The apparatus decodes data based on the plurality of TR locations associated with the at least one of the DL channel or the UL channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
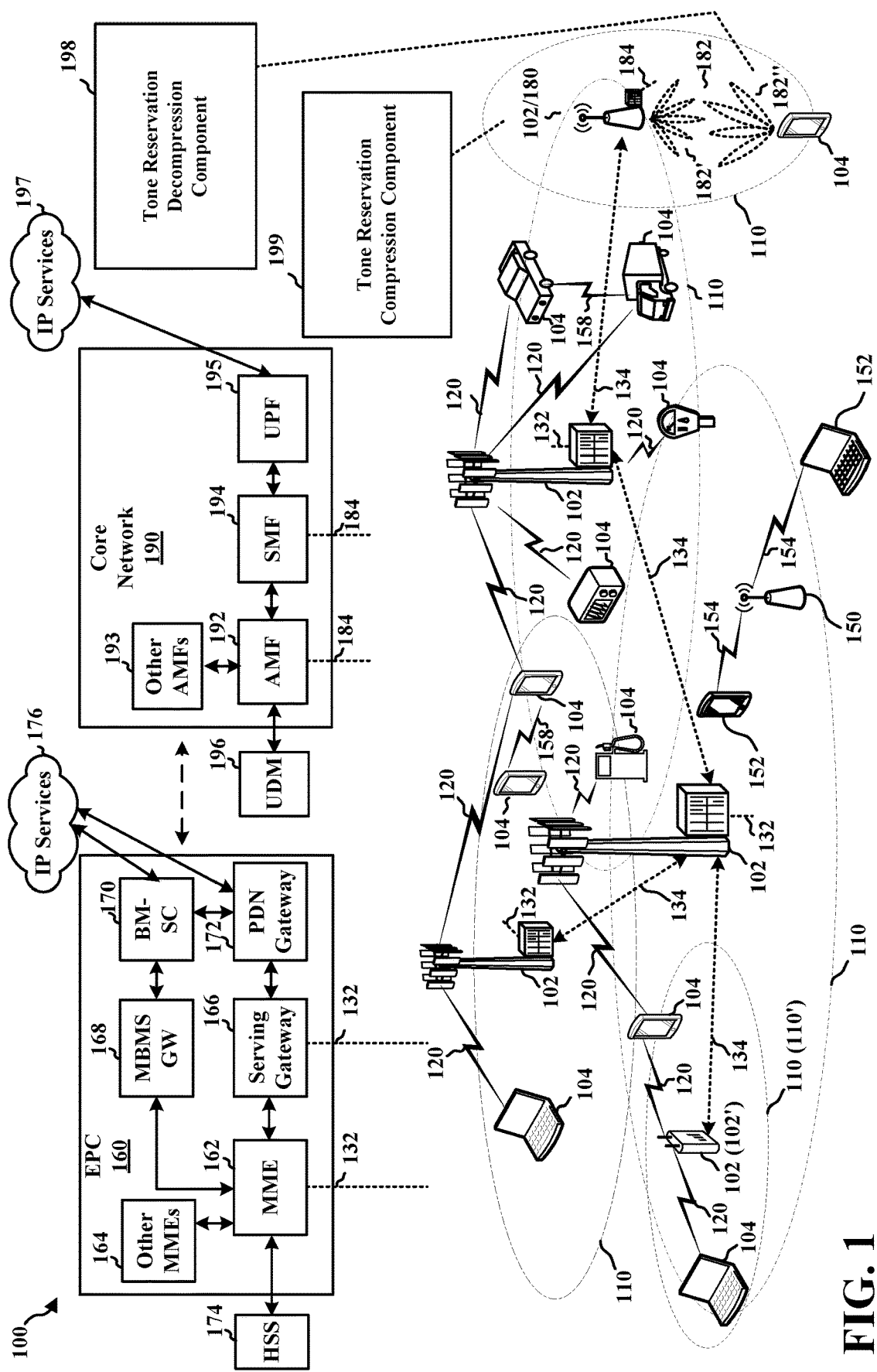
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable a transmitting device (e.g., a base station, a UE) to compress tone reservation (TR) locations to improve efficiency of PAPR. For example, aspects presented herein may enable a transmitting device a base station to compress tone reservation signaling for PAPR reduction, such that the base station may indicate to a UE the location of reserved tones and data tones of a transmission with a small payload.

In certain aspects, the base station 102/180 may include a tone reservation compression component 199 configured to compress tone reservation signaling for PAPR reduction and transmit the compressed tone reservation signaling to the UE 104. In one configuration, the tone reservation compression component 199 may be configured to estimate an uplink (UL) channel based on one or more sounding reference signals (SRSs) from a user equipment (UE), the estimated UL channel corresponding to a downlink (DL) channel. In such configuration, the tone reservation compression component 199 may select a plurality of tone reservation (TR) locations associated with at least one of the DL channel or the UL channel. In such configuration, the tone reservation compression component 199 may transmit, to the UE, an indication of the plurality of TR locations associated with at least one of the DL channel or the UL channel.

In certain aspects, the UE 104 may include a tone reservation decompression component 198 configured to receive a compressed tone reservation signaling and determine (e.g., based on decompression) the location of the reserved tones and/or data tones of a transmission, and to decode, receive, or monitor the transmission based on the location of the reserved tones and/or data tones. In one configuration, the tone reservation decompression component 198 may be configured to receive, from a base station, an indication of a plurality of TR locations associated with at least one of a DL channel or an UL channel. In such configuration, the tone reservation decompression component 198 may calculate, based on the indication, the plurality of TR locations associated with the at least one of the DL channel or the UL channel. In such configuration, the tone reservation decompression component 198 may decode data based on the plurality of TR locations associated with the at least one of the DL channel or the UL channel.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
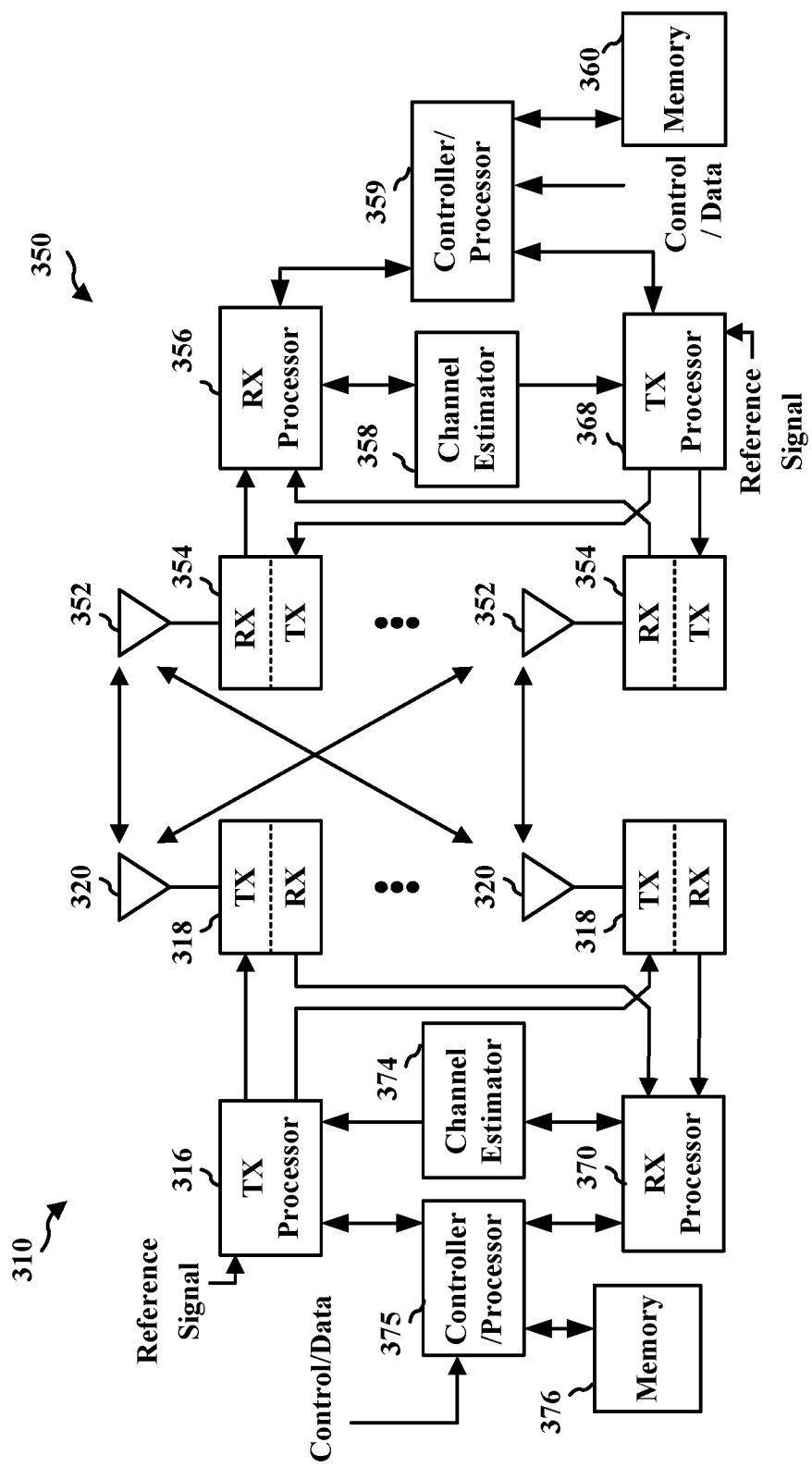
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the tone reservation decompression component 198 of FIG. 1.

At least one of the TX processor 316, the RX processor 370, and the controller/processor 375 may be configured to perform aspects in connection with the tone reservation compression component 199 of FIG. 1.

A power amplifier (PA) is a device that may be used to increase the magnitude (e.g., voltage, current, power, etc.) of an input signal. A PA may take in a weak electrical signal or waveform, and then reproduce a similar but stronger waveform at an output by using extra power. The design and implementation of PAs in wireless communications may help signals transmitted by transmitting devices (e.g., a base station, a UE, etc.) to be strong enough to reach (e.g., to be received by) receiving devices.

Figure 4:
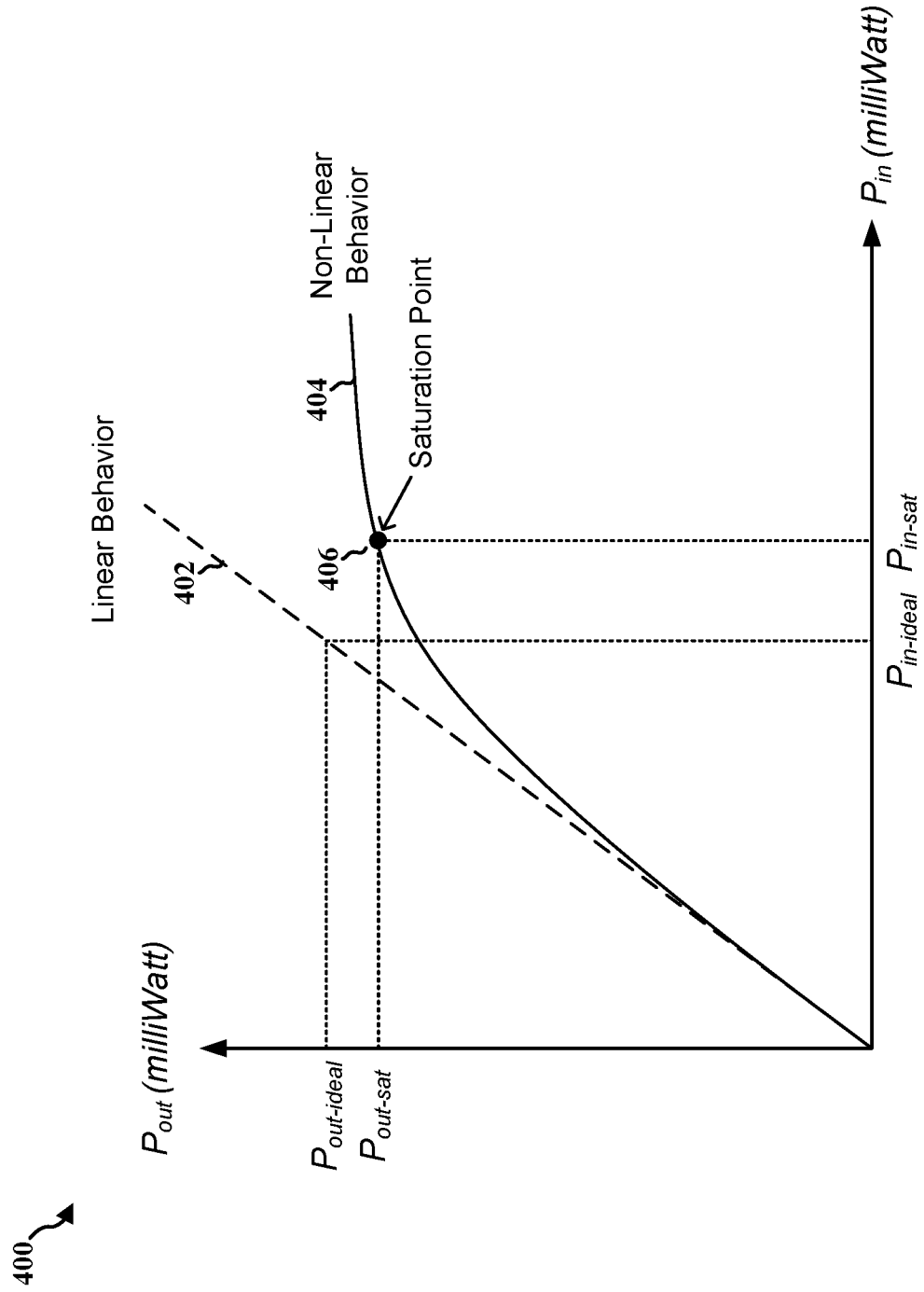
FIG. 4 is a diagram illustrating an example of relationship between an input signal and an output signal of a power amplifier in accordance with various aspects of the present disclosure.

As a PA may consume extra power to magnify an input signal, a goal in designing a PA is to have a linear relationship between an input signal and an output signal. FIG. 4 is a diagram 400 illustrating an example relationship between an input signal ($P_{in}$) and an output signal ($P_{out}$) for a PA with a linear behavior 402 and a PA with non-linear behavior 404 in accordance with various aspects of the present disclosure. For the PA with linear behavior 402, the output signal (e.g., $P_{out-ideal}$) may be directly proportional to the input signal (e.g., $P_{in-ideal}$). For example, if 10 milliwatts (mW) of input signal power corresponds to 15 mW of output signal power, then 20 mW of input signal power may correspond to 30 mW of output signal power, etc.

Figure 5:
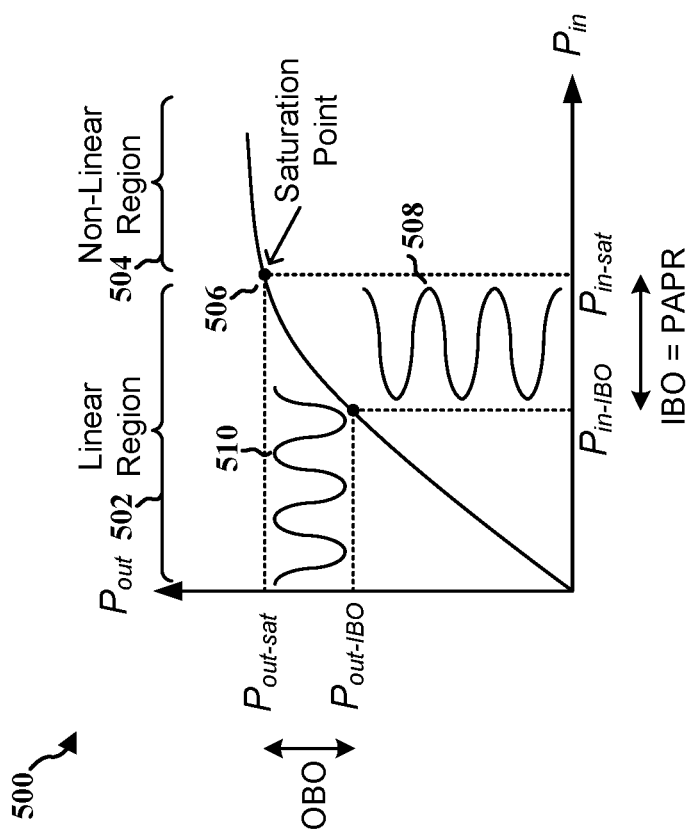
FIG. 5 is a diagram illustrating an example of operating a power amplifier at a mean input power in accordance with various aspects of the present disclosure.

However, PAs may approximately follow the linear behavior for a limited range of input signals (e.g., within the linear region 502 as shown by FIG. 5) and may have non-linear behavior outside the range of the input signals. As the output signal power of the PA may not increase indefinitely due to physical constrains, at some points (e.g., at the saturation point 406), an increase in input signal power for the PA may not produce a discernible increase in the output signal power. Thus, the PA may start to follow non-linear behavior 404 as shown by FIG. 4, and the non-linear behavior 404 may become particularly noticeable when the PA is operating at higher input signal powers (e.g., at the non-linear region 504 as shown by FIG. 5). For example, when a PA is saturated (e.g., passing the saturation point 406), the PA's output signal may no longer be proportional to the input signal, where a large increase in an input signal power beyond the saturation input signal power (e.g., $P_{in-sat}$) point may yield a relatively small increase in an output signal power from the saturation output signal power (e.g., $P_{out-sat}$) point. As the PA may consume a significant fraction of the power in a communication device, operating the PA beyond the saturation point may waste additional power, and may be an inefficient use of the PA. In addition, the non-linear behavior 404 of the PA may also result in in-band and out-of-band distortion of the signal, and may degrade error vector magnitude (EVM) at the receivers when the input signal power and the output power are not proportional.

To avoid operating a PA beyond the saturation point (e.g., to avoid the drawbacks of the non-linearity at high input power), the PA may be configured to operate at a mean input power that is several dB lower than the saturation point, such that the input signal power may not exceed the saturation input signal power (e.g., $P_{in-sat}$) point. FIG. 5 is a diagram 500 illustrating operating a PA at a mean input power (e.g., $P_{in-IBO}$) in accordance with various aspects of the present disclosure. For example, for an input signal waveform 508 with a high peak to average power ratio (PAPR), the waveform 508 may be transmitted in the linear region 502 of the PA by decreasing the average power of the input signal (e.g., $P_{in}$). This may be referred to as an "input backoff" (IBO), which may result in a proportional "output backoff" (OBO). A PA may operate most efficiently when the IBO is close or equal to the PAPR of the input signal. For example, if an input signal has a PAPR of X dB, then an IBO of X dB may be applied to the PA to avoid the non-linearity. This enables the input signal to be amplified within the linear region 502 when the waveform 508 of the input signal is at the peak. For example, if the waveform 508 has a PAPR of 10 dB, and the PA also has an IBO equals or close to 10 dB, then the waveform 508 may be amplified within the linear region 502 without crossing the saturation point 506 (e.g., $P_{in-sat}$). This may prevent the output signal waveform 510 from distortion during an amplification, which may happen when the waveform 508 or part of the waveform 508 is amplified at the non-linear region 504.

Figure 6B:
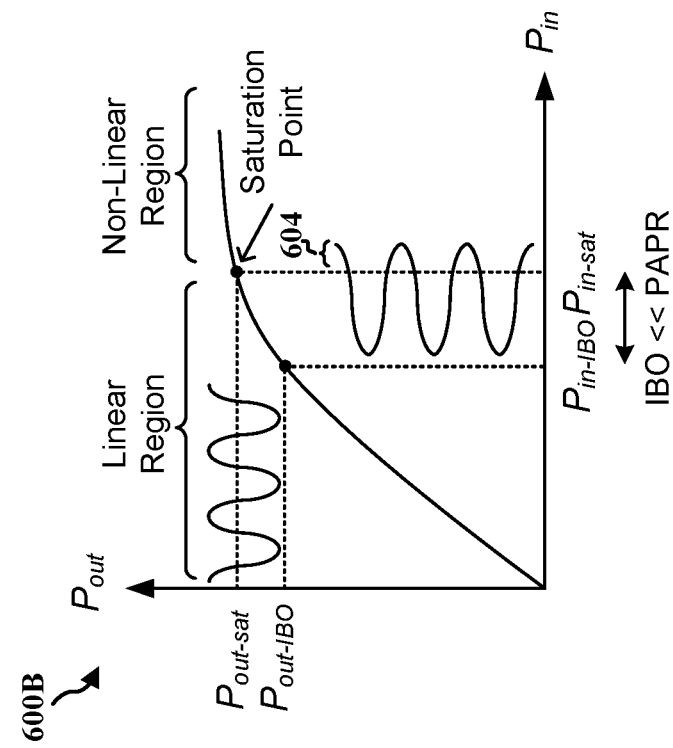
FIGS. 6A and 6B are diagrams illustrating examples of different input backoff setting in accordance with various aspects of the present disclosure
Figure 6A:
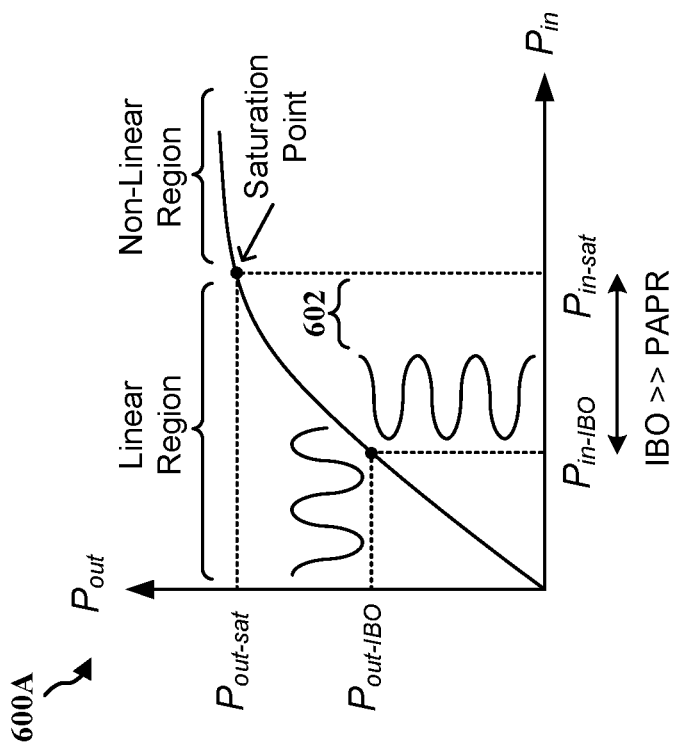

However, if a high IBO is applied to a PA but the input signal does not have a high PAPR (e.g., IBO>>PAPR), such as shown by diagram 600A of FIG. 6A, it may be an inefficient use of the PA as it may reduce the maximum amplification of the PA. For example, a portion 602 of the linear region within the PA may be unused due to the high IBO, particularly the region close to the saturation points where a high input signal (e.g., near $P_{in\text{-}sat}$) may be amplified to nearly proportionate high output signal (e.g., near $P_{out\text{-}sat}$). This may limit the maximum performance of the PA and reduce a transmission range of a transmitting device. On the other hand, if the IBO applied to a PA is too low and the input signal has a PAPR that exceeds the IBO (e.g., PAPR>>IBO), such as shown by diagram 600B of FIG. 6B, at least a portion (e.g., portion 604) of the input signal may be amplified at the non-linear region of the PA, which may cause the output signal to be distorted and the bit error rate (BER) performance of a transmitting device may be degraded.

While OFDM signals may have tolerance to inter-symbol interference and good spectral efficiency, due to large fluctuations in their signal envelopes, OFDM signals may suffer from significant PAPR that may grow rapidly with the size of the OFDM block. For example, for a network that employs larger OFDM blocks, such as may be employed in 5G NR and beyond, the OFDM blocks may have higher PAPR. Due to the high PAPR, a PA designed for a communicating device capable of transmitting larger OFDM block(s) may be configured with a high IBO, which may result in an inefficient use of the PA when the communicating device is not transmitting signals with high PAPR, such as described in connection with FIG. 6A. Therefore, as an alternative or in addition to applying a high IBO to the PA, PAPR reduction techniques may be used to reduce the PAPR of an input signal, such that the IBO applied to a PA may be kept at a lower value to maintain the spectral and energy efficiency of the PA. In addition, by reducing the PAPR, a PA may amplify the signal at a higher input power (e.g., as close to the saturation point as possible and within the linear region) and produce higher output signal.

In some examples, PAPR reduction techniques may be data-dependent and computationally expensive, which may make them unfit for a real-time implementation. For example, when a PAPR reduction mechanism is designed for the front end of a real-time transmission chain (e.g., to be operated on the fly), the PAPR reduction mechanism may have a relatively short time to process the input signal. For example, every time the PAPR reduction mechanism receives an OFDM symbol, it may have less than a millisecond to process the OFDM symbol to reduce the PAPR. For most PAPR techniques, a millisecond may not be enough as a lot of processing may be involved during the PAPR reduction. Clipping and filtering (CF) is one of the PAPR reduction techniques that may be used for real-time implementations, e.g., because of its low complexity and low processing time. However, CF and similar techniques may distort the signals themselves and result in in-band signal distortion, which may not converge to a desirable solution.

Cellular networks that operate in a higher and wider range of frequencies (e.g., 4G LTE, 5G NR, etc.) may have an abundance of bandwidth both in the uplink and downlink. This may include the addition of FR2 as well as the increase in the available bandwidth to 100 MHz in the sub-6 frequencies (i.e., frequencies under 6 GHz). Cellular networks with abundant or excess bandwidth may use longer OFDM symbols (e.g., larger OFDM blocks) for transmissions. While increasing the OFDM symbol size may increase the PAPR of the OFDM symbol as mentioned above, the excess bandwidth may also be used for PAPR reduction. For example, when a transmitting device such as a UE is transmitting in the uplink, there may be multiple resource blocks available to the transmitting device.

In some techniques described herein, a transmitting device may use a tone reservation (TR) approach to reduce the PAPR for an OFDM symbol. These techniques may include scenarios where a transmitting device may use unused, otherwise-idle, or reserved tones (e.g., unused or reserved subcarriers) of an OFDM symbol to accommodate a peak-cancelling signal is capable of reducing the PAPR of the OFDM symbol. For example, in a sample deployment scenario, the magnitude and the phase of reserved tones may be optimized for a given OFDM symbol to minimize the PAPR. Additionally, or alternatively, a transmitting device may reserve some tones in subcarriers of an OFDM symbol, and the reserved tones may be used for PAPR reduction instead of transmitting data.

Tones used for PAPR reduction in reservation techniques may have a variety of features. For example, a tone reserved for PAPR reduction (e.g., tone containing the peak-cancelling signal) may be referred as a peak reduction tone (PRT). Given that, in some scenarios, there may be no overlap between one or more reserved tones and one or more data tones within one or more respective OFDM symbols (e.g., the reserved tones may be orthogonal with the data tones), a tone reservation scheme does not introduce any EVM and/or adjacent channel leakage ratio (ACLR) restrictions. Thus, a receiving device (e.g., a base station receiving the OFDM symbol) may be configured to block, disregard, ignore, and/or bypass signals in the reserved tones and decode signals in data tones. Bypassing and not decoding signals in reserved tones enables and provides improved device signal processing and improves communication throughput. As such, for purposes of the present disclosure, the reserved tones may also be referred to as "non-data tones," which may include PRTs.

Varying tone characteristics may aid in some deployments. As one example, the magnitude and the phase of one or more reserved tones may be adjusted for each OFDM symbol to produce suitable PRTs. And the allocation of PRTs in each OFDM symbol may also be customized for optimized PAPR reduction. Additionally, or alternatively, a number of PRTs for each OFDM symbol may vary depending on the available bandwidth. While the location of PRTs may be determined on a per-OFDM symbol basis, fixing the location of PRTs for OFDM symbols in advance may reduce the complexity of the transmitting device. As the optimization (e.g., allocation) may be performed in advance instead of in real-time, the transmitting device's performance may be significantly improved. In addition, there may be a generally good index allocation for the PRTs within the OFDM symbol.

Figure 7:
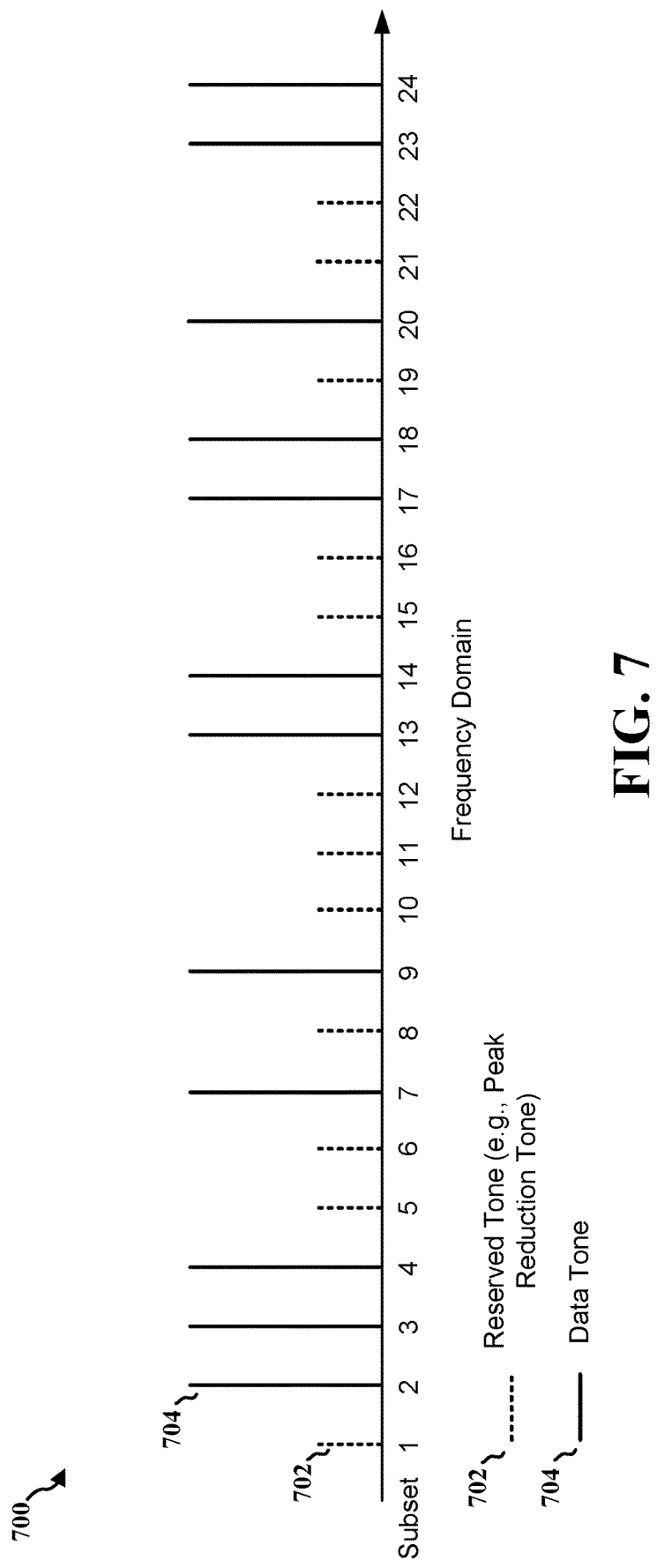
FIG. 7 is a diagram illustrating an example tone distribution showing peak reduction tones and data tones in accordance with various aspects of the present disclosure.

FIG. 7 is a diagram 700 illustrating an example allocation of reserved tones 702 (e.g., PRTs) and data tones 704 (e.g., tone containing data information), where several tones are depicted within an OFDM symbol in a frequency domain in accordance with various aspects of the present disclosure. In some examples, reserved tones 702 may be disposed among data tones 704 such that some data tones 704 may flank reserved tones 702. In some aspects, allocation of reserved tones 702 in an OFDM symbol may enable low PAPR in the time domain. For example, a transmitting device may obtain the waveform of the OFDM symbol in time domain by taking the Inverse Fast Fourier Transform (IFFT) of the signal in frequency domain. FIG. 7 depicts a sample arrangement of PRTs and data tones and many other PRT/ data tone arrangements may also be used given configurable nature of techniques discussed herein.

In some examples, a transmitting device may customize the location and/or the number of reserved tones 702 for an OFDM symbol. For example, if a transmitting device (e.g., a base station, a UE, etc.) is granted/scheduled with two (2) resource blocks that include twenty-four (24) tones for transmission, the transmitting device may use half of the available tones (e.g., twelve (12) tones) for reserved tones 702, and the transmitting device may optionally use the other half of the available tones for data tones 704. In some examples, the transmitting device may choose any subset of the twenty-four available tones for reserved tones 702 if the receiving device is made aware of the transmitting device's choice, which may be configured through signaling and/or fixed in advance. For example, the transmitting device may choose subsets 1, 5, 6, 8, 10, 11, 12, 15, 16, 19, 21 and 22 for reserved tones, and may inform its choice of the subsets to the receiving device via signaling. In some examples, the subsets may be fixed in advance so that the receiving device may know which tones are PRTs without receiving additional signaling from the transmitting device.

In one example, if the location of the reserved tones is known by a transmitting device (e.g., a UE, a base station, etc.), the transmitting device may apply a signal to clipping noise ratio-tone reservation (SCR-TR) algorithm to the reserved tones to optimizes their values for PAPR reduction. For example, suppose a transmitting device is granted a total of N tones {1, . . . , N} (e.g., subsets 1-24 of FIG. 7) for transmission. Let Φ be a subset of {1, . . . , N} corresponding to the PRT locations (e.g., subsets 1, 5, 6, 8, 10-12, 15, 16, 19, 21 and 22 of FIG. 7). The data tones may be allocated to the remaining tones, {1, . . . , N}\Φ (e.g., subsets 2-4, 7, 9, 13, 14, 17, 18, 20, 23, 24 of FIG. 7). Then, a frequency domain kernel P may be constructed based on:

$$P_i = \begin{cases} 1 & \text{if } i \in \Phi \\ 0 & \text{if } i \in [N]\setminus\Phi \end{cases},$$

where $P_i$ may denote the $i^{th}$ tone of the total granted tones N (e.g., $P_1=1^{st}$ tone, $P_4=4^{th}$ tone, $P_{24}=24^{th}$ tone, etc.). Based on the frequency domain kernel, when the $i^{th}$ tone is a subset of Φ, a value of 1 may be assigned to the $i^{th}$ tone (e.g., subsets 1, 5, 6, 8 . . . of FIG. 7). When the $i^{th}$ tone is not a subset of Φ, a value of 0 may be assigned to the $i^{th}$ tone instead (e.g., subsets 2-4, 7, 9 . . . of FIG. 7). Next, let p denotes P in the time domain, where a time domain kernel p may be obtained by taking the IFFT of P, e.g., p=ifft(P), and let X denotes the frequency-domain data (e.g., data tones). As the value 0 is assigned to the $i^{th}$ tone when the $i^{th}$ tone is not a subset of Φ, naturally, $X_i=0$, if i∈Φ. For example, in FIG. 7, $X_1$ and $X_5$ may be 0 as subsets 1 and 5 are within the subset of Φ, and $X_2$ and $X_7$ may not be 0 as subsets 2 and 7 are not within the subset of Φ, etc. Similarly, let x denotes X in time domain kernel, where x may be obtained by taking the IFFT of X, e.g., x=ifft(X). If the number of PRTs is sufficiently large and the location of the PRTs are chosen properly, then the time domain kernel p may look like a delta function with negligible side-lobes (shown in FIG. 9).

Figure 8:
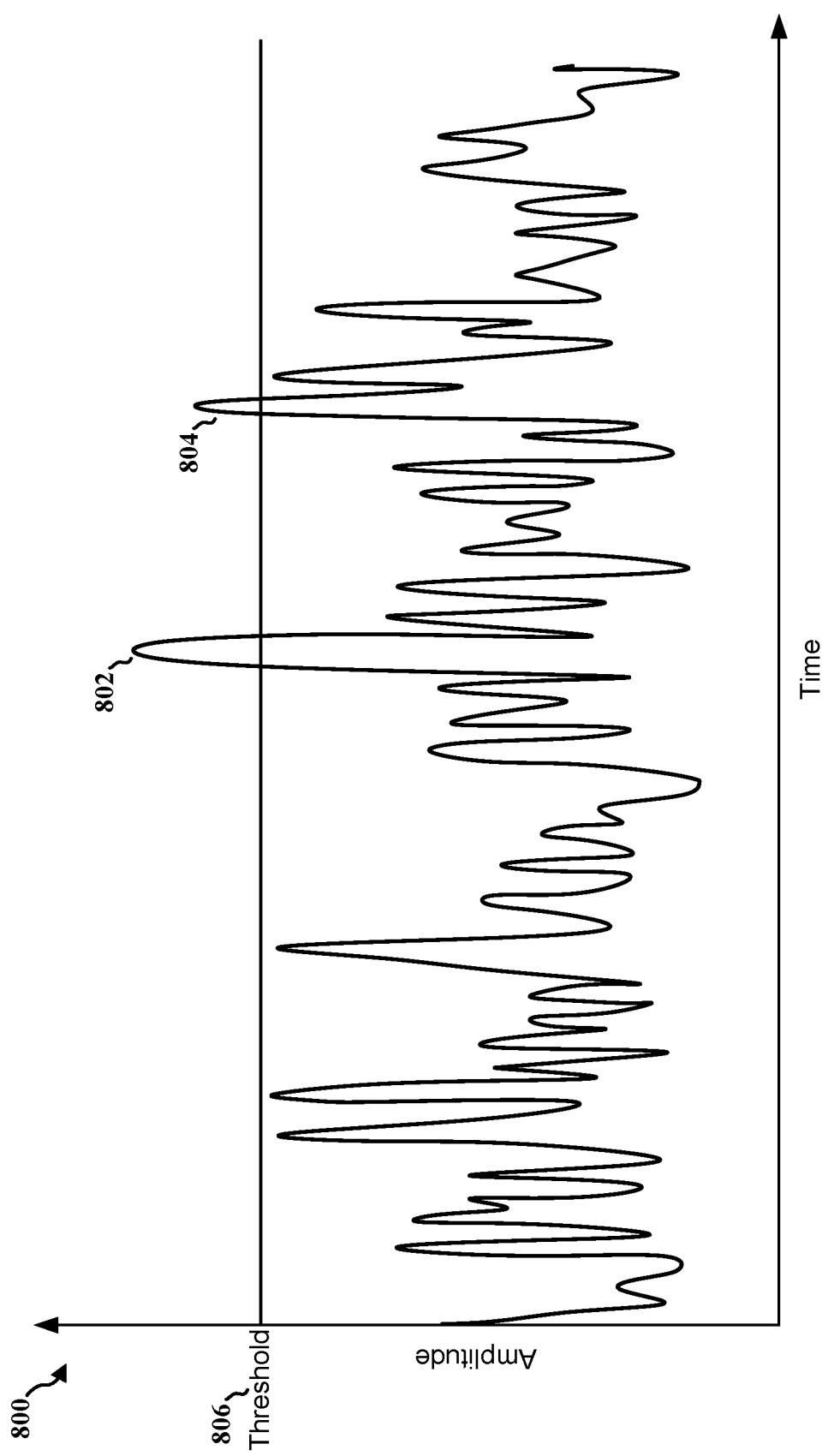
FIG. 8 is a diagram illustrating an example of a time domain data waveform in accordance with various aspects of the present disclosure.

FIG. 8 is a diagram 800 illustrating an example of a time domain data signal (e.g., x or an OFDM signal) in accordance with various aspects of the present disclosure. A threshold 806 may be defined/configured for a transmitting device for determining whether a particular waveform of a time domain data has one or more peaks exceeding the threshold 806, and the transmitting device may determine whether any of the one or more peaks is to be reduced. For example, based on the threshold 806, a transmitting device may be able to determine that the waveform has a peak 802 and a peak 804 exceeding the threshold 806. The transmitting device may also determine the magnitude and location of the peaks, and/or the largest peak among the peaks (e.g., the peak 802).

Figure 9:
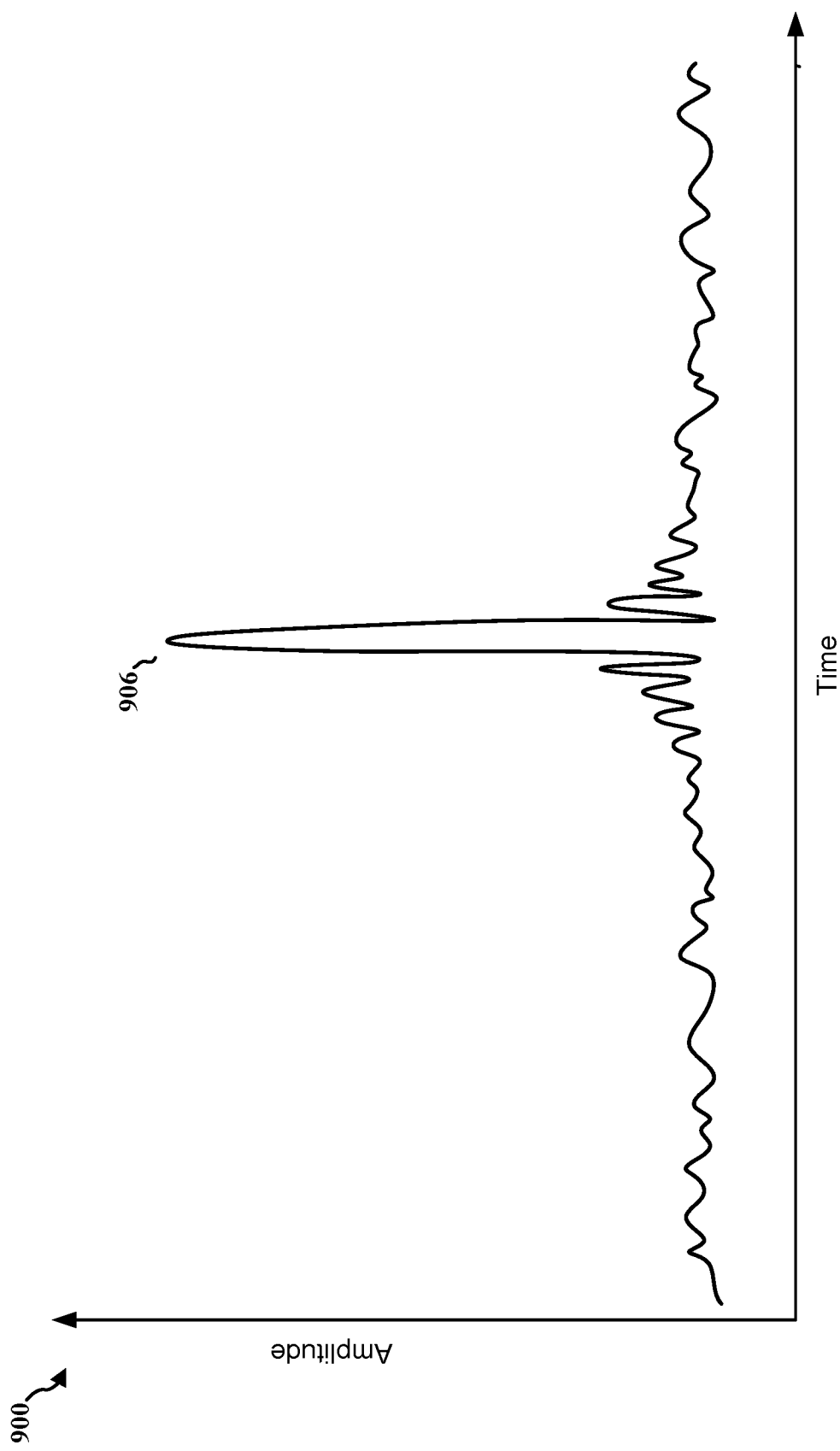
FIG. 9 is a diagram illustrating an example of a time domain kernel in accordance with various aspects of the present disclosure.

FIG. 9 is a diagram 900 illustrating an example of a time domain kernel for p in accordance with various aspects of the present disclosure. If the number of PRTs is sufficiently large and the location of the PRTs are chosen properly, then the time domain kernel p may look like a delta function with negligible side-lobes as shown by the diagram 900. For example, the time domain signal may appear as a waveform with a single peak 906, where the single peak 906 may be relatively narrow in width compare to the largest peak of x (e.g., 802 of FIG. 8). Next, the SCR-TR algorithm may circularly shift p in the time-domain until p aligns with the largest peak of x.

Figure 10:
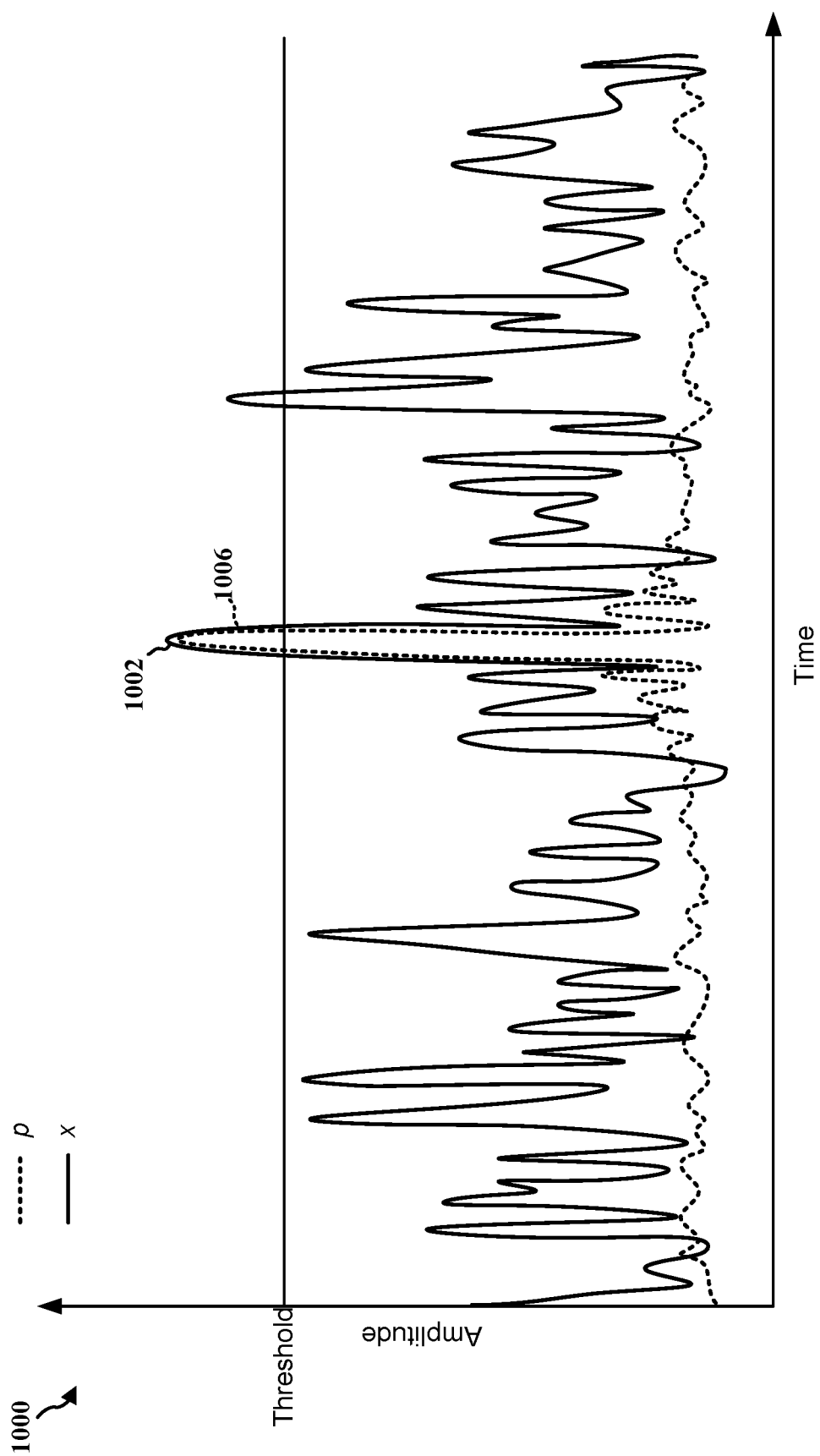
FIG. 10 is a diagram illustrating an example of a circular shifting and alignment based on SCR-TR algorithm in accordance with various aspects of the present disclosure.

FIG. 10 is a diagram 1000 illustrating an example of circular shifting and alignment based on the SCR-TR algorithm in accordance with various aspects of the present disclosure. First, the SCR-TR algorithm may determine the location of the largest peak of x. Let j E [LN] be the index, where L may denote an oversampling factor, N may denote a total number of granted tones and j may be an element of LN. Next, the algorithm circularly shifts p until the peak 1006 of p aligns with the largest peak 1002 of x, which may be represented by $p^j$=circshift(p,j). The algorithm then subtracts the scaled and shifted p from x to obtain $$x_{new} = x - \frac{|x(j)| - \mu}{p(0)} p_j e^{i \angle x(j)},$$

where μ is the target peak, <x(j) is the phase of x(j), and i=$\sqrt{-1}$. In other words, the cancellation signal may be circularly shifted to the peak location of x and then subtracted from the original information signal, so that the power of the peak tones may be reduced.

Figure 11:
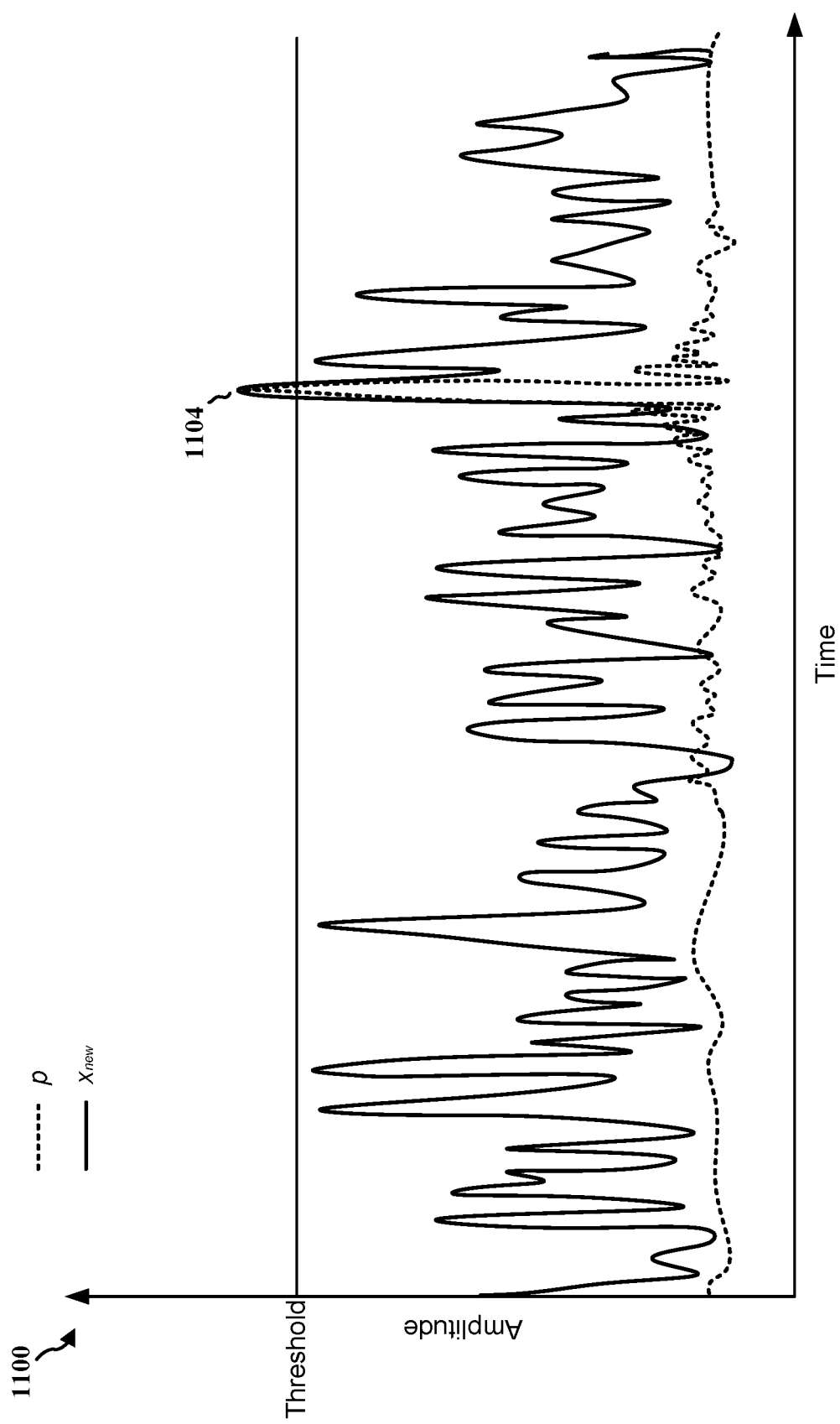
FIG. 11 is a diagram illustrating an example of a circular shifting and alignment based on SCR-TR algorithm in accordance with various aspects of the present disclosure.

FIG. 11 is a diagram 1100 illustrating $x_{new}$, where the previous largest peak of x has been subtracted by the scaled and shifted p in accordance with various aspects of the present disclosure. The SCR-TR algorithm may iterate this process serval times to optimize the PAPR reduction. For example, the process may be performed in several iterations, starting from the highest peak and canceling one peak per iteration. As shown by FIG. 11, after previous largest peak of x (e.g., the peak 802, 1002) is eliminated from x, the algorithm may circularly shift p to a next highest peak 1104 of x that is also above the threshold, and subtracted the peak 1104 by the scaled and shifted p and so on. Note that circularly shifting p in the time domain does not impact the location of reserved tones in the frequency domain, but it may disturb their phase. For example, phases may be added to P. However, as data tones (e.g., subsets 2-4, 7, 9 . . . of FIG. 7) are assigned with the value zero (0), their values may not be changed because adding phase to zero result in zero. On the other hand, the phase of PRTs may be modified because they are assigned with the value one (1). So, the PRT may become a complex number with magnitude one and the added phase. Thus, circularly shifting p does not impact the location of reserved tones. By applying the SCR-TR algorithm for the tone reservation, PAPR of the OFDM symbol may be reduced to a proper margin, and the corresponding PA may be configured with a lower IBO. For example, The OFDM symbol using 64 PRTs or 96 PRs may have an overall lower PAPR compare to the OFDM symbol that does not use any PRTs.

In mmWave (e.g., FR2) and sub-THz (e.g., FR4 and beyond) frequencies, while an increase in bandwidth (e.g., above 1 GHz) may provide a larger subcarrier spacing (SCS) (e.g., 1 MHz or above), the slot latency may also decrease linearly. In some examples, RF power consumption (e.g., power used for transmitting signals) at these frequencies may be much higher compared to RF power consumption at lower frequencies, where thousands of Watts may be consumed in each based station for the power amplifiers. As such, PAPR reduction techniques described in connection with FIGS. 7 to 11 may provide a number of benefits. For example, PAPR reduction techniques may improve the efficiency and performance of power amplifiers, thereby reducing powers used for the power amplifiers.

As discussed in connection with FIG. 7, a transmitting device may choose locations of the reserved tones. As a receiving device may be configured to not decode reserve tones, frequency resource with better channel condition (e.g., stronger tones) may be more suitable for transmitting data. Thus, in some examples, a transmitting device may be configured to allocate one or more reserved tones on channels and/or REs with weaker channel condition. For example, a reduced power-PAPR reduction scheme based on tone reservation (TR) may be configured to use REs (e.g., tones) where the channel is weak based on the DMRS channel estimation, such as REs with signal-to-noise ratio (SNR) below a threshold. In other words, the transmitting device may allocate reserved tones (e.g., may apply TR) to frequency resources that have lower SNR. In other examples, other methods may be used for projecting the signal peaks into the desired SCs based on the TR. For example, an iterative approach may be used where the peaks distortion (e.g., equal to the desired signal minus the clipped signal) may pass through FFT to zero the data tones and keep the TR tones. Then, the resulting TR tones may pass through IFFT to recalculate the peaks distortion again.

Figure 12:
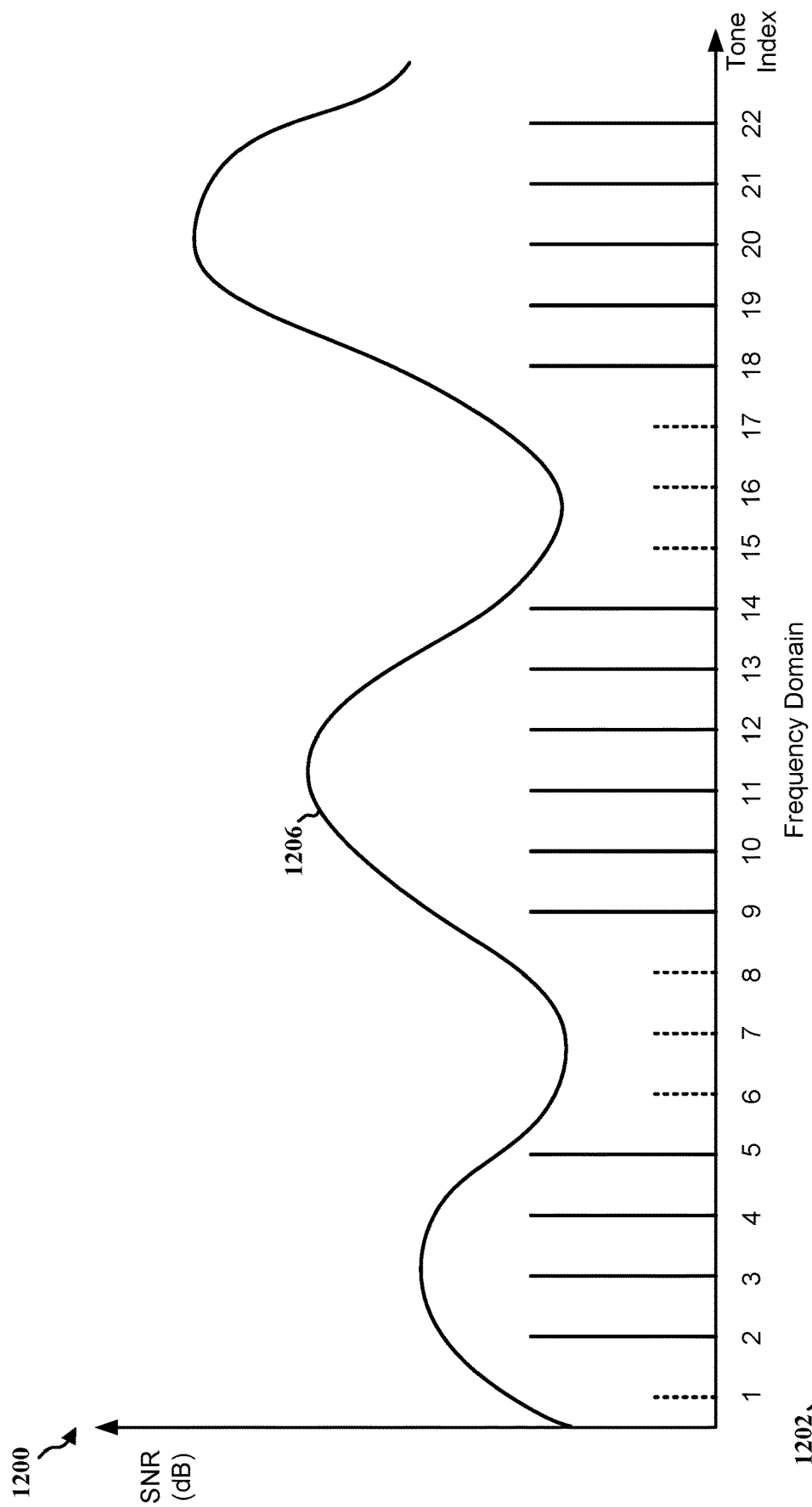
FIG. 12 is a diagram illustrating an example of locating reserved tones based on signal to noise ratio (SNR) of the channel in accordance with various aspects of the present disclosure.

FIG. 12 is a diagram 1200 illustrating an example of a transmitting device allocating reserved tones based on SNR of the channel in accordance with various aspects of the present disclosure. In one example, a transmitting device (e.g., a UE, a base station, etc.) may first estimate the channel condition of a channel by measuring the SNR 1206 of the channel within a frequency resource or band, where the frequency resource or band may include a plurality of tones (e.g., SCs). The transmitting device may obtain the SNR 1206 based on one or more reference signal(s) (e.g., CSI-RS, DMRS, SRS, etc.) transmitted from a receiving device (e.g., a UE, a base station, etc.). After the transmitting device estimates the channel condition (e.g., the SNR 1206) for the plurality of tones, the transmitting device may allocate reserve tones to the plurality of tones based at least in part on the estimated channel condition. For example, if a transmitting device is configured to allocate reserved tones on tones having lower/lowest SNR, as shown by the diagram 1200, the transmitting device may allocate reserved tones at tone index numbers 1, 6, 7, 8, 15, 16, and 17 as these tones may have an SNR below a threshold or lower than other tones. As a receiving device may skip decoding reserved tones, the SNR of the reserved tones may be less important to the receiving device compared to the SNR of the data tones. In other words, the transmitting device may use tones with a lower SNR (e.g., tones with tone index numbers 1, 6-8 and 15-17) for reserved tones 1202, and use tones with a higher SNR (e.g., with tone index numbers tones 10-13 and 19-22) for data tones 1204 (e.g., for transmitting data).

In some examples, a transmitting device may indicate TR information to a receiving device indicating the allocation/locations of the reserved tones in one or more transmissions, such that the receiving device may be aware which tones (e.g., REs) are reserved tones and/or which tones are data tones, etc. Then, the receiving device may decode the one or more transmissions based on the TR information. For example, the receiving device may be configured to decode data tones and skip/ignore reserved tones.

In another example, a receiving device may be configured to estimate the location of the reserved tones, where the receiving device may be configured to follow/apply a same reserved tone allocation rule as used by a transmitting device. For example, if a transmitting device is configured to allocate reserved tones on REs/tones with lowest/lower SNR (e.g., compared to other available REs), such as described in connection with FIG. 12, the receiving device may also be configured to determine the location of the reserved tones based on REs/tones with lowest/lower SNR. As channel reciprocity may apply where channel condition for uplink and downlink between a transmitting device and a receiving device may be similar or the same, the receiving device may be able to identify the location of the reserved tones with high accuracy without receiving TR information from the transmitting device.

In some examples, if a receiving device has a full knowledge about the location of the reserved tones (e.g., the TR information is indicated to the transmitting device), a higher PAPR gain may be achieved at the receiving device (e.g., a gain of 3.5 dB or more), whereas if the receiving device does not have full knowledge about the location of the reserved tones (e.g., location of the reserved tones are estimated based on channel reciprocity), a performance degradation may occur at the receiving device (e.g., may reach up to 1 dB loss). However, TR information may occupy a large amount of signaling overhead depending on the number of tones (e.g., data tones and reserved tones). For example, referring back to FIG. 12, as there are twenty-two (22) tones in the transmission (e.g., tone index #1 to #22), the transmitting device may use a twenty-two bit field to indicate the location of the reserved tones 1202 and/or the data tones 1204, e.g., bit one (1) may be used for indicating a data tone and bit zero (0) may be used for indicating a reserved tone or vice versa.

Techniques discussed herein may provide a number of benefits. For example, some aspects presented herein may enable a transmitting device to indicate the location of reserved tones and/or data tones to a receiving device using a smaller payload by configuring the transmitting device to compressed tone reservation location signaling. Some aspects presented herein may provide an efficient method for compressing the tone reservation locations for minimal signaling payload and maximal TR gains. In some examples, the compressed tone reservation locations signaling may reduce the signaling payload and improve the TR estimation performance, which may also reduce the power consumption at the base station and/or the UE (e.g., efficiency of PA and/or PAPR reduction is improved). For purposes of the present disclosure, the term "tone reservation" and "reserved tones" may be used interchangeably, which may refer to tones/SCs that are not used for carrying data (e.g., data tones) and/or tones/SCs that is used for PAPR reduction. In addition, for purposes of the present disclosure, a tone reservation that is known to a receiving device (e.g., the location of the reserved tones is indicated to the receiving device) may be referred to as a channel aware tone reservation.

Figure 13:
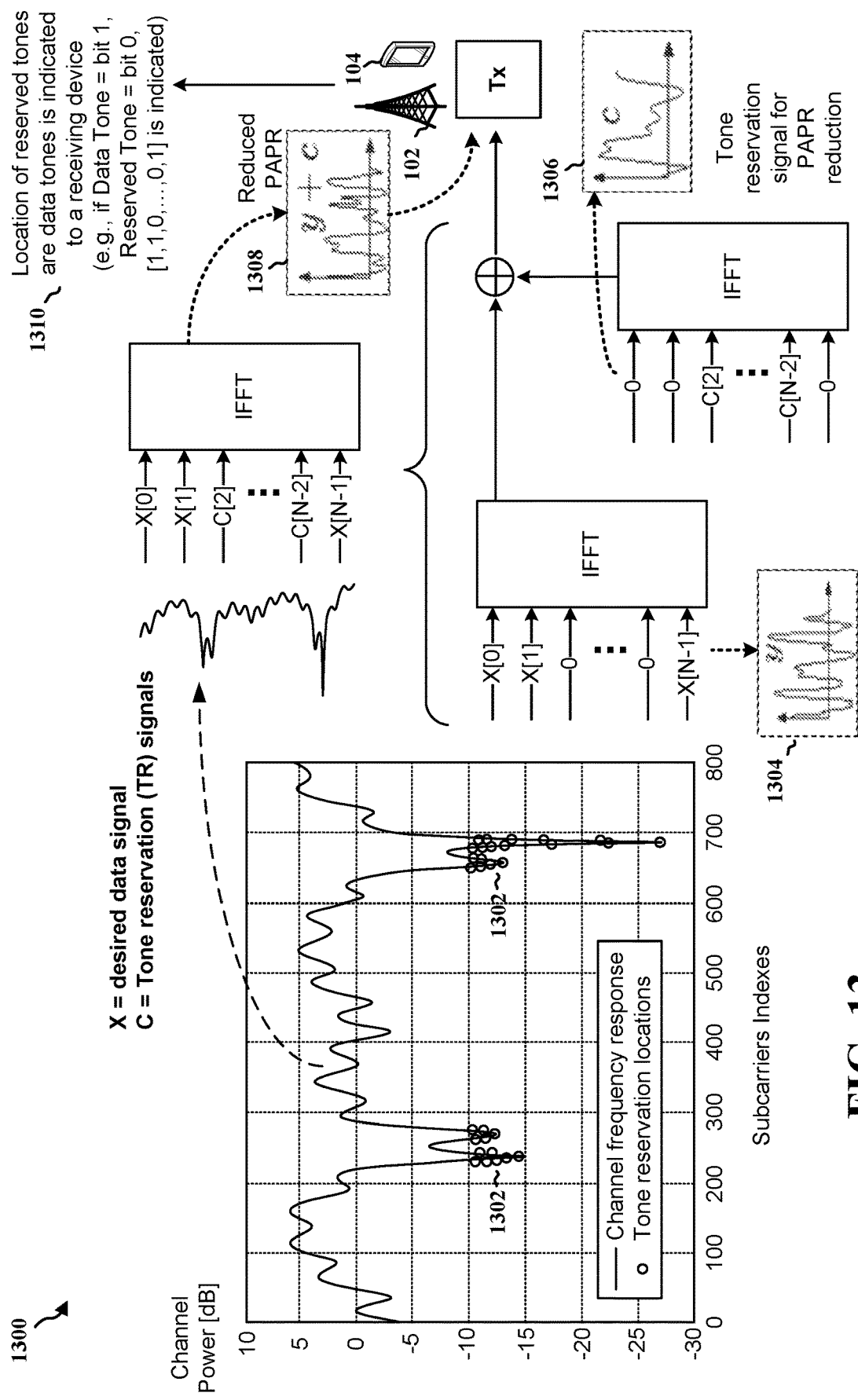
FIG. 13 is a diagram illustrating an example of a channel aware tone reservation in accordance with various aspects of the present disclosure.

FIG. 13 is a diagram 1300 illustrating an example of a channel aware tone reservation in accordance with various aspects of the present disclosure, where a transmitting device (e.g., a base station, a UE, etc.) may be configured to map reserved tones based on one or more criteria. For example, the transmitting device may be configured to map the reserved tones to subcarriers (SCs) with lowest channel energy (or channel energy below a threshold), and/or to SCs with lowest channel capacity (or channel capacity below a threshold)(e.g., which may be applied for MIMO), etc. For example, a transmitting device may be configured to select tone reservation locations (e.g., allocate reserved tones) on multiple subcarriers based on measured channel power of the subcarriers. In one example, as shown at 1302, the transmitting device may be configured to select tone reservation locations on subcarriers with a measured channel power below a threshold (e.g., −10 dB).

After the transmitting device determines the location of the reserved tones and/or the data tones, as shown at 1304, the transmitting device may use the data tones (e.g., represented with X) to carry data signals, and as shown at 1306, and the transmitting device may use the reserved tones (e.g., represented with C) for PAPR reduction (e.g., for generating/constructing tone reservation signal for PAPR reduction), such as described in connection with FIGS. 8 to 11. Then, as shown at 1308, the transmitting device may transmit the data signal with PAPR reduced to a receiving device.

As shown at 1310, after determining the location of the reserved tones and/or data tones, the transmitting device may indicate the location of the reserved tones and/or data tones to the receiving device, such that the receiving device may be able to decode data tones and skip/ignore reserved tones. For example, referring back to FIG. 12, if each data tone 1204 in a vector (e.g., TR information to be indicated) is represented with bit one (1) and each reserved tone in the vector is represented with bit zero (0), then the vector may be represented with [0,1,1,1,1,0,0,0,1,1,1,1,1,1,0,0,0,1,1,1, 1,1]. In some examples, as shown in FIG. 12 and at 1302 of FIG. 13, because of the existing channel coherence bandwidth (e.g., similar or equivalent to a channel delay spread), a majority of the tone reservations may be in consecutive locations. Thus, the vector indicating the location of the reserved tones and/or data tones may include multiple groups of zeros and ones.

In one aspect of the present disclosure, the consecutiveness property associated with location of the reserved tones and data tones may be utilized for compressing the vector (e.g., the TR information) representing the location of the reserved tones and data tones to reduce the signaling overhead for the TR information. In one example, a transmitting device may be configured to signal the location of subcarriers which have a change from a data tone to a reserved tone or change from a reserved tone to data tone, which may also be referred as a differential reporting. In such an example, any consecutive data tones (e.g., data SCs) or reservation tones (e.g., TR SCs) may be represented by bit zero (0). For example, referring back to FIG. 12, if the location of the reserved tones and data tones is represented by [0,1,1,1,1, 0,0,0,1,1,1,1,1,0,0,0,1,1,1,1,1], after applying the differential signaling, the location of the reserved tones and data tones may be represented by [0,1,0,0,0,1,0,0,1,0,0,0,0,0,1, 0,0,1,0,0,0,0,0] where bit one (1) may indicate the location of subcarriers which have a change from a data tone to a reserved tone or from a reserved tone to data tone, and bit (0) may indicate consecutive data tones or reserved tones, etc. As such, when differential signaling is used by a transmitting device, the signaling overhead may be reduced as fewer locations may be signaled by the transmitting device. Additionally, and optionally, one or more compressing method may further apply to such differential signaling to further reduce the size of the differential signaling.

In one example, an additional or optional time compression mechanism may be applied to the differential signaling to further reduce the size of the differential signaling. For example, if the transmit TR location indication is configured to be reported at a periodicity (e.g., at every X slot(s), 1 slot, 10 slots, etc.), as the channel condition may not have changed much between two reports, a differential/time compression mechanism may be applied between a last uncompressed TR location and a next uncompressed TR location. Then, a loss less compression may further be applied to the resulting differential signaling.

Figure 14:
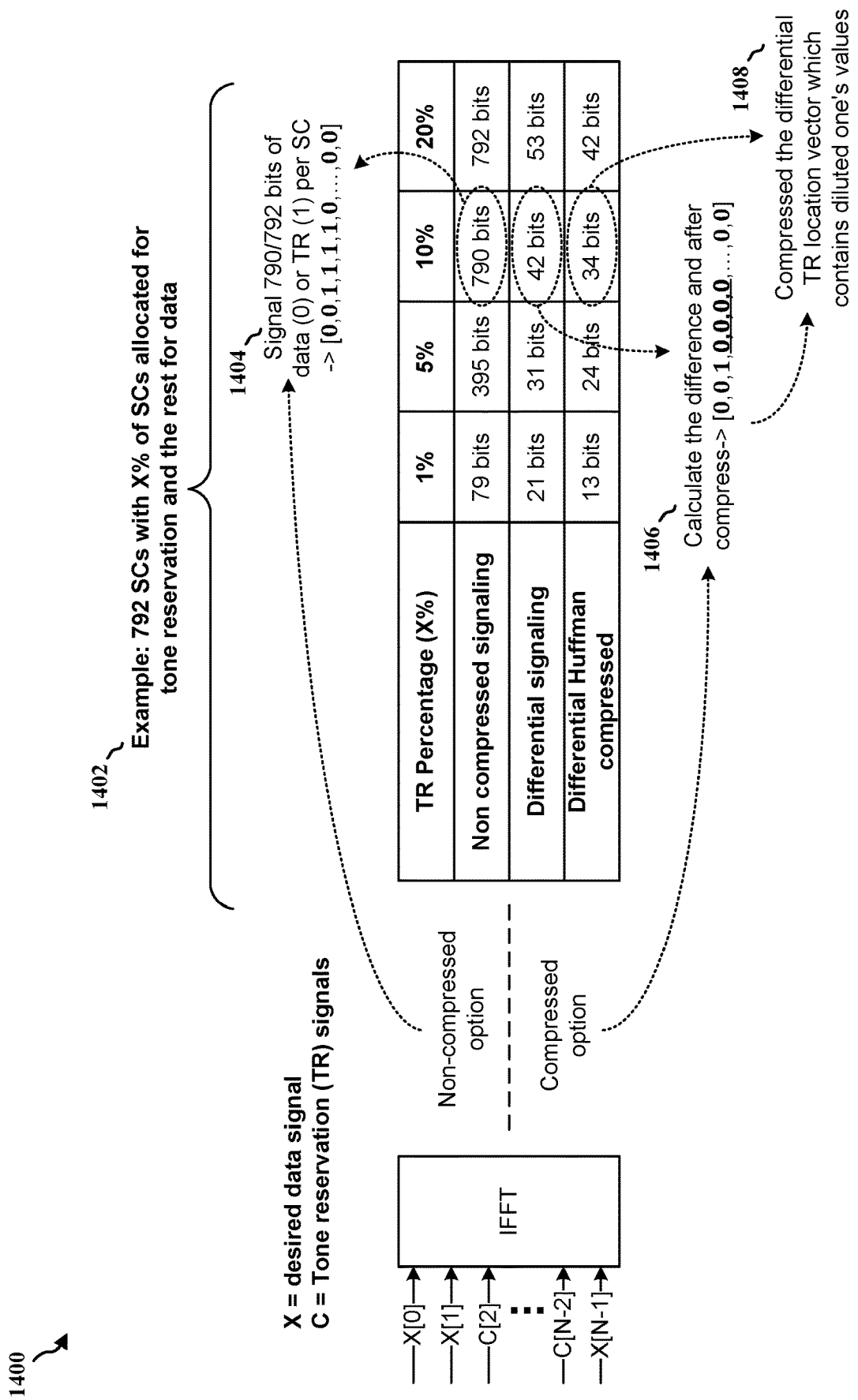
FIG. 14 is a diagram illustrating an example size comparison between non-compressed signaling and compressed signaling in accordance with various aspects of the present disclosure.

FIG. 14 is a diagram 1400 illustrating an example size comparison between non-compressed signaling and compressed signaling in accordance with various aspects of the present disclosure. In one example, as shown at 1402, a total of 792 subcarriers may be configured for a transmitting device for transmission, where the transmitting device may allocate X % of the total 792 subcarriers for tone reservation signals (e.g., for reserved tones, PRTs, etc.).

As shown at 1404, if the transmitting device is configured to use 10% of the total 792 subcarriers for tone reservation signals (e.g., 79 reserved tones), in case no differential signaling is used, at least 792 bits may be signaled by the transmitting device where each bit may represent if the SC is a data tone or a reserved tone (or signaling of 79 indexes signaling each of 10 bits which may also equivalent to 790 bits). On the other hand, as shown at 1406, in case differential signaling is used, a fewer amount of locations may be signaled by the transmitting device which may reduce the signaling to approximately 42 bits. Additionally, and/or optionally, as shown at 1408, the differential signaling may further be compressed by at least one other type of encoding, such as Huffman encoding, which may further reduce the signaling to approximately 34 bits. As such, aspects presented herein may enable a transmitting device to signal locations of reserved tones and/or data tones of a transmission to a receiving device with a small additional payload (e.g., 34/42 bits instead of 790/792 bits), which may improve the PAPR reduction efficiency and performance without increasing the signaling overhead significantly.

Figure 15:
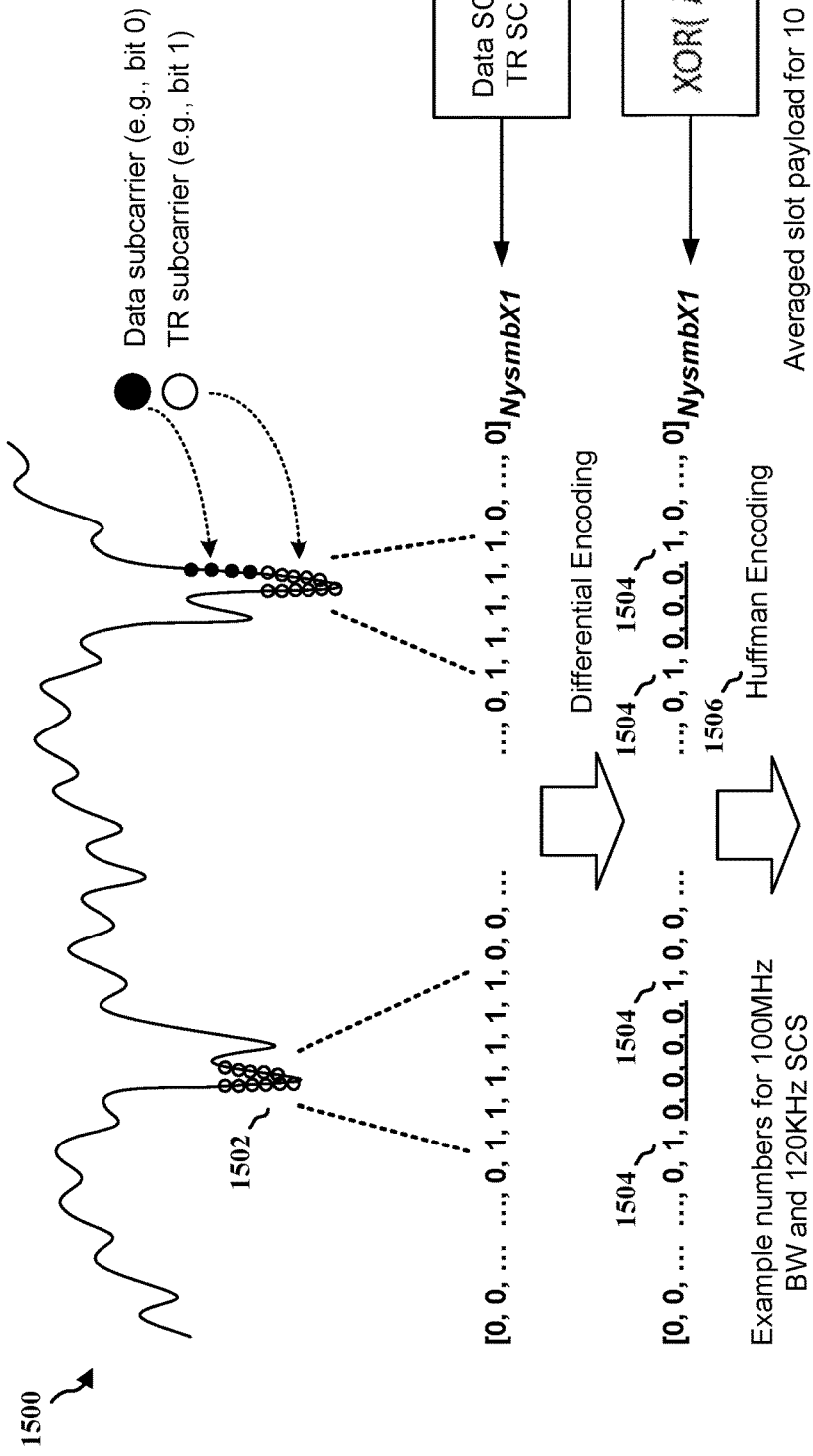
FIG. 15 is a diagram illustrating an example size for a Huffman encoding in accordance with various aspects of the present disclosure.

FIG. 15 is a diagram 1500 illustrating an example size for a Huffman encoding in accordance with various aspects of the present disclosure. As shown at 1502, a majority of the tone reservations may be in consecutive locations due to the existing channel coherence bandwidth. To exploit or to take the advantage of the consecutiveness property, as shown at 1504, a transmitting device may be configured to signal the SC's location which had a change from data to tone reservation or from tone reservation to data (e.g., the differential reporting), such as described in connection with FIGS. 13 and 14. At 1506, this signal may be further compressed by Huffman encoding. As shown at 1508, after applying the Huffman encoding, the size of the signal indicating the TR locations may be further reduced.

Figure 16:
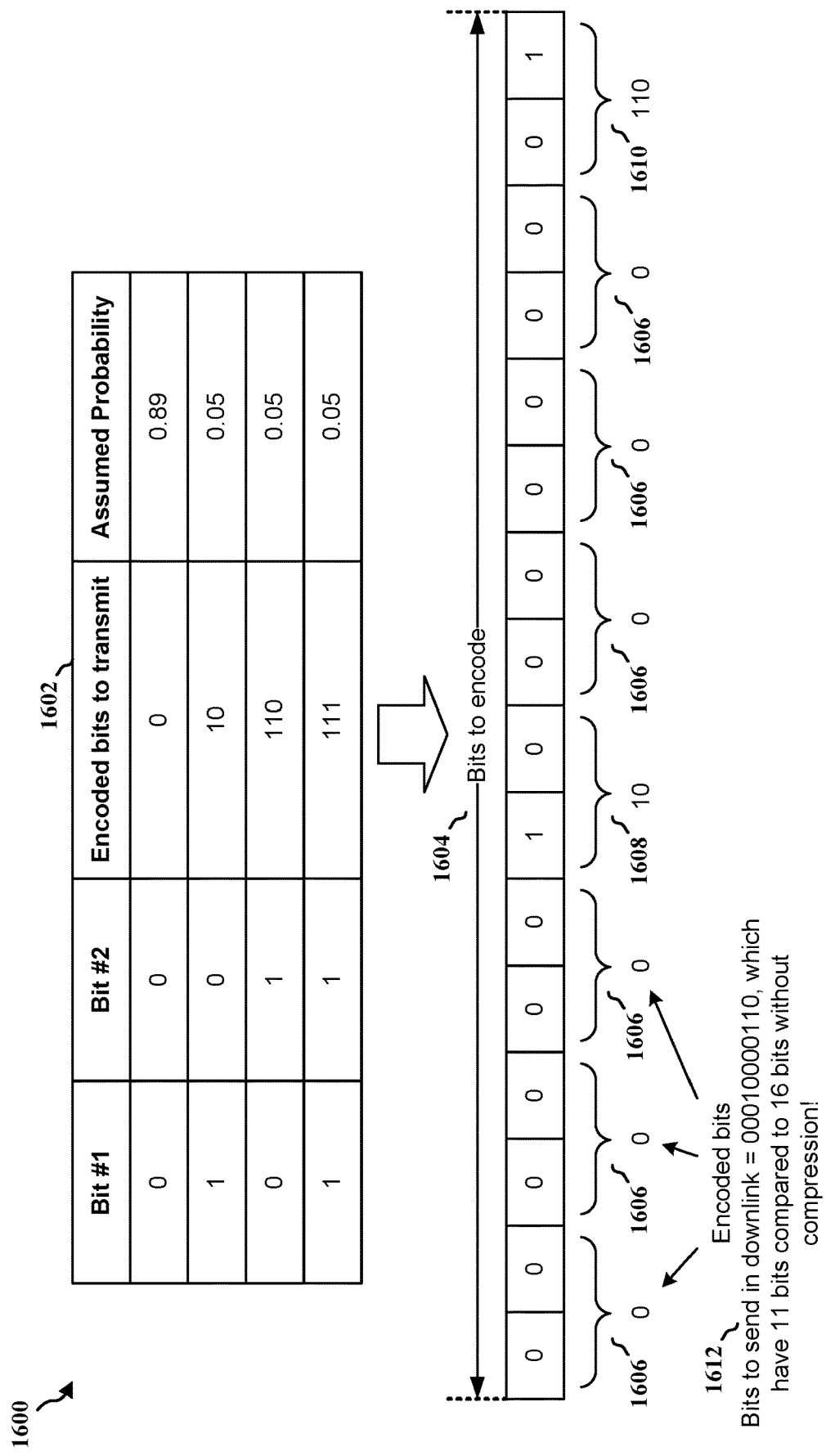
FIG. 16. is a diagram illustrating an example of a Huffman encoding in accordance with various aspects of the present disclosure.

FIG. 16. is a diagram 1600 illustrating an example of a Huffman encoding in accordance with various aspects of the present disclosure. Huffman coding may provide a lossless data compression algorithm. Under the Huffman coding, a transmitting device may assign variable-length codes to different inputs, where lengths of the assigned codes may be based on the frequencies of corresponding inputs. For example, the most frequent input may be assigned with the smallest code and the least frequent input may be assigned with the largest code. For example, as shown at 1602, if a bit sequence [0, 0] (e.g., an input) has a probably of 89% of showing up in a vector (e.g., the bit sequence shows up most frequently in the vector), the bit sequence [0, 0] may be assigned with a variable length code [0] (e.g., a smallest code among the variable-length codes). On other hand, if a bit sequence [1, 1] has a probably of 1% of showing up in the vector (e.g., the bit sequence shows up least frequently), the consecutive bits [1, 1] may be assigned with a variable length code [1, 1, 1] (e.g., a longest code among the variable-length codes), etc.

Then, as shown at 1604, a transmitting device (or a compressing device) may apply the configured coding (e.g., the assigned variable-length codes) to bits in a vector (e.g., to bits that are to be encoded). For example, as shown at 1606, bit sequences with the bit sequence [0, 0] within the vector may be encoded with [0]; as shown at 1608, bit sequences with the bit sequence [1, 0] within the vector may be represented with [1, 0]; as shown at 1610, bit sequences with the bit sequence [0, 1] within the vector may be represented with [1, 1, 0]; and bit sequences with the bit sequence [1, 1] within the vector may be represented with [1, 1, 1], etc. As the bit sequence (e.g., the bit sequence [0, 0]) that is more likely to show up is reduced in size (e.g., from 2 bits to 1 bit) and the bit sequence with an increase in size (e.g., the bit sequence [1, 1] and the bit sequence [0, 1]) is less likely to show up, the Huffman encoding may provide additional compression to a signaling. For example, as shown at 1612, the Huffman coding may enable a 16-bits code to be compressed to a 11-bits code.

In some examples, for a transmitting device that is configured to transmit multiple differential signaling (e.g., multiple TR locations signaling with differential encoding), the transmitting device may further apply a time compression between the multiple differential signaling to further reduce the size of the differential signaling. For example, if the transmit TR location indication is configured to be reported at a periodicity (e.g., at every X slot(s), 1 slot, 10 slots, etc.), as the channel condition may not have changed much between two reports, a time compression mechanism may be applied between a last TR location and a next TR location.

Figure 17:
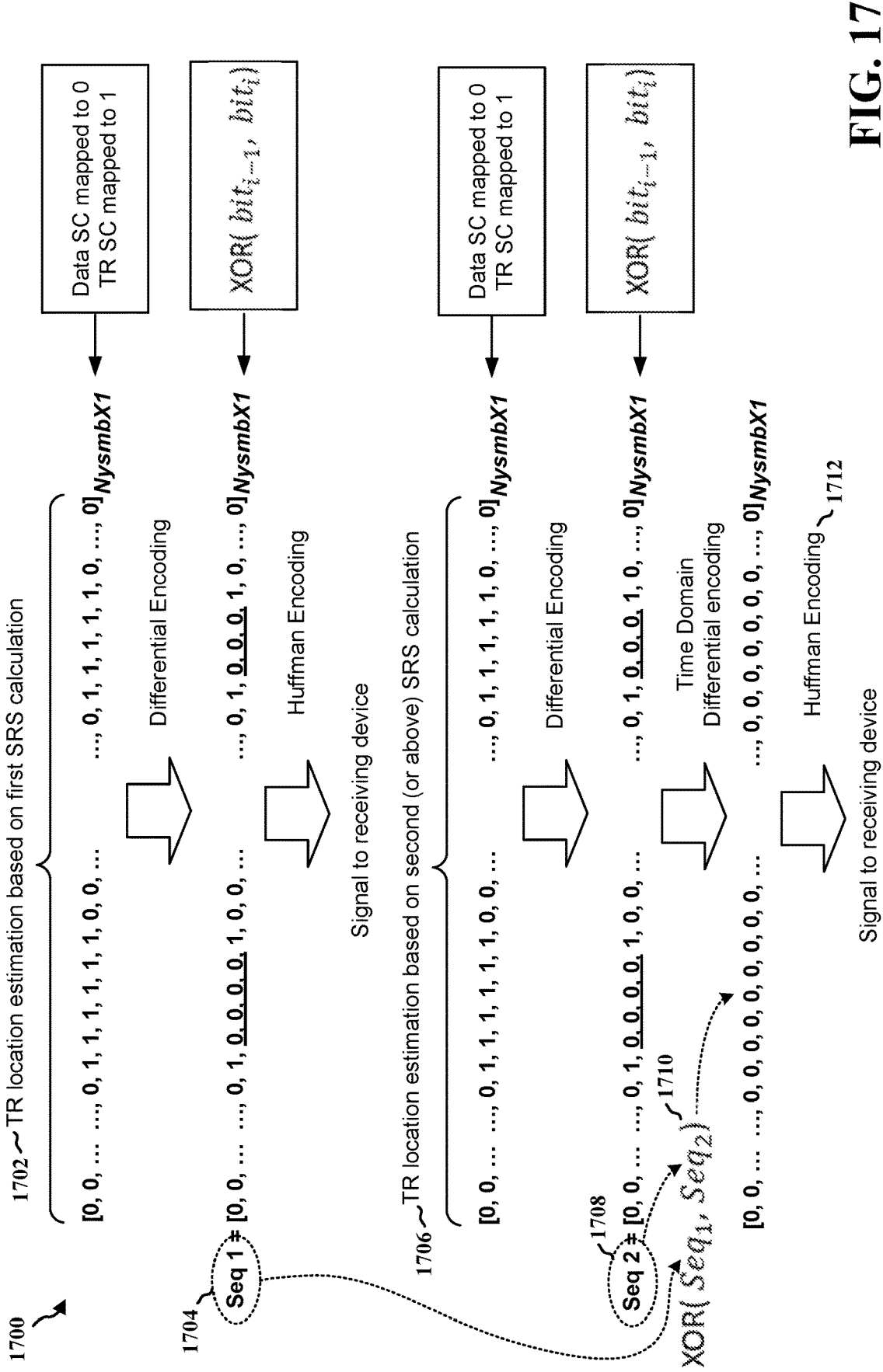
FIG. 17 is a diagram illustrating an example of a time compression in accordance with various aspects of the present disclosure.

FIG. 17 is a diagram 1700 illustrating an example of a time compression in accordance with various aspects of the present disclosure. As shown at 1702, a transmitting device may estimate TR locations for a first transmission based on a first SRS calculation, such as described in connection with FIGS. 12 and 13. Then, the transmitting device may apply a differential encoding and/or a Huffman encoding (or another lossless encoding) to reduce the size of the TR locations signaling, such as described in connection with FIGS. 13 and 14. For example, as shown at 1704, the transmitting device may generate a first sequence (e.g., sequence 1—a compressed signaling) for the TR locations. Similarly, as shown at 1706, the transmitting device may estimate TR locations for a second transmission based on a second (or above) SRS calculation. Then, as shown at 1708, the transmitting device may apply a differential encoding to reduce the size of the TR locations signaling, and the transmitting device may generate a second sequence (e.g., sequence 2—a compressed signaling) for the TR location. As the channel condition may not have changed much between the first sequence and the second sequence, as shown at 1710, the transmitting device may further apply a differential/time compression to the first sequence and the second sequence to reduce the total size of the first sequence and the second sequence.

Additionally, as shown at 1712, the transmitting device may also apply Huffman encoding or another lossless encoding to the first sequence and the second sequence in additional to the time domain differential encoding to further compress the signaling for the first sequence and the second sequence.

In another example, the transmitting device may apply another differential calculation (e.g., a second differential calculation) on the one's indexes (e.g., location of bit=1) prior to applying the Huffman encoding or another lossless encoding to further enhance the performance and/or the efficiency of the compression.

Figure 18:
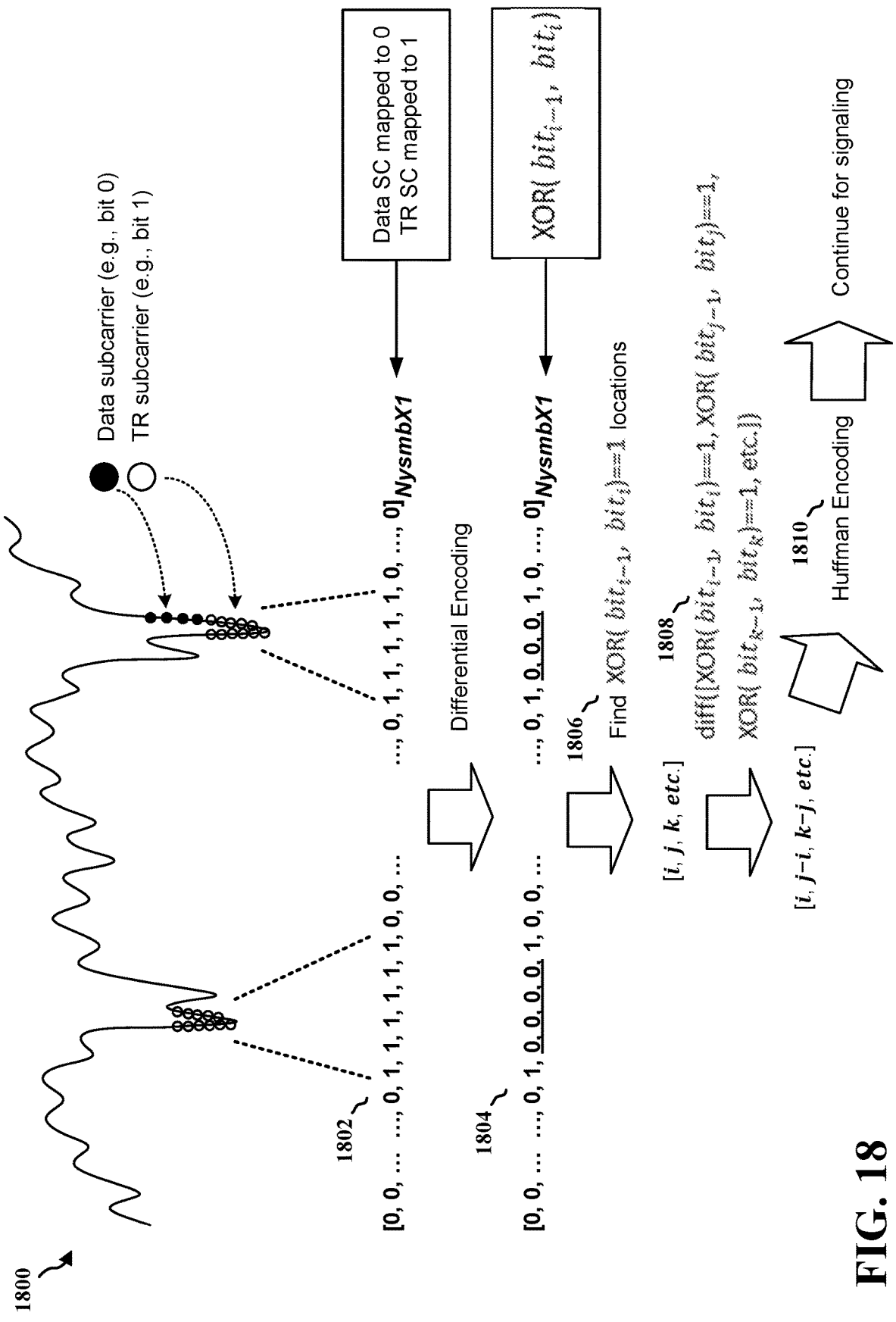
FIG. 18 is a diagram illustrating an example of applying a differential calculation on the ones indexes of a differential signaling in accordance with various aspects of the present disclosure.

FIG. 18 is a diagram 1800 illustrating an example of applying a differential calculation on the one's indexes (e.g., indexes of bit 1s) of a differential signaling in accordance with various aspects of the present disclosure. As shown at 1802, a transmitting device may estimate TR locations for a transmission based on an SRS calculation, such as described in connection with FIGS. 12 and 13. Then, as shown at 1804, the transmitting device may apply a differential encoding to the TR location indexes to reduce the size of the TR locations signaling, such as described in connection with FIGS. 13 and 14. Then, as shown at 1806, the transmitting device may find the first XOR(bit$_{i-1}$, bit$_i$)==1 index and compress i. Then, as shown at 1808, the transmitting device may calculate the differential of each XOR (e.g., diff([XOR (bit$_{i-1}$, bit$_i$)==1, XOR(bit$_{j-1}$, bit$_j$)==1, XOR(bit$_{k-1}$, bit$_k$)==1, etc.]).

For example, if an RB is allocated with 12 REs, and the TR and data locations for the RB may be represented by a vector: [0, 0, 0, 0, 1, 1, 1, 0, 0, 0, 0, 0] where one (1) indicates TR and zero (0) indicates data. After a differential encoding is applied to the vector, the vector may become: [0, 0, 0, 0, 1, 0, 1, 0, 0, 0, 0, 0] (e.g., bit one (1) indicates a change from a data tone to a reserved tone or from a reserved tone to data tone). Then, the transmitting device may find the indexes of one (1) values, which is [5,7] for this example (e.g., the fifth bit and the seventh bit of the vector are bit 1s). Then, a differential may be applied to this value and the first index (e.g., 5) may be kept: [5, 7-5]=[5, 2]. Then, a Huffman encoding or other lossless encoding may further be applied to the vector to compress the vector, and the vector may be transmitted. As the large index is the first one value (e.g. at the fifth bit) but the next one value (e.g., at the seventh bit) may be smaller after the differential operation due to the limited null size. Thus, this may make the Huffman compression much more efficient.

At 1810, the transmitting device may apply Huffman encoding or another lossless encoding to the differential vector (e.g., obtained at 1808), and the transmitting device may transmit/signal the resulting compressed differential vector. This method may improve the performance of the differential signaling compression, and may take the advantage of using the finite channel null size. For example, as a channel response may have a finite frequency domain (FD) correlation, a transmitting device may expect a channel fading in most cases will have a small and finite size. By making the lower index number (to be compressed) to be with a higher probability compared to the high index numbers, the Huffman compression may become more effective.

Figure 19:
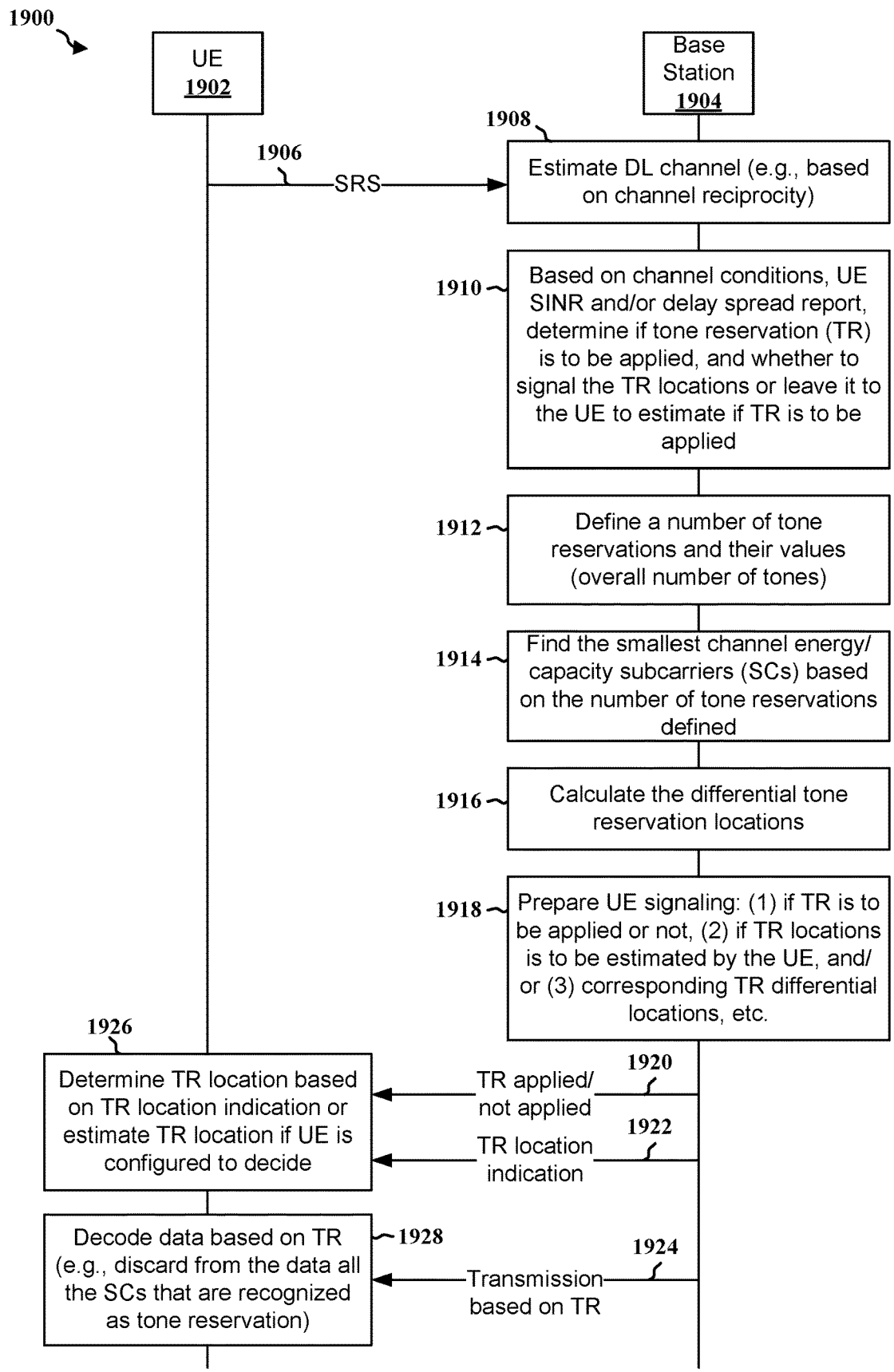
FIG. 19 is a communication flow illustrating an example of compressing tone reservation signaling in accordance with various aspects of the present disclosure.

FIG. 19 is a communication flow 1900 illustrating an example of compressing tone reservation signaling in accordance with various aspects of the present disclosure. Note while aspects described herein show a base station applying tone reservation for transmissions to a UE (e.g., for downlink (DL) transmissions), they are merely for illustrative purposes. Aspects presented herein may also be applied to a UE for uplink (UL) transmissions. In addition, the numberings (e.g., 1906, 1908, etc.) associated with the communication flow do not specify a particular temporal order and are used as numerical references for the communication flow.

At 1906, a UE 1902 may transmit one or more reference signals, such as sounding reference signals (SRS), to a base station 1904. Based on the received reference signals, as shown at 1908, the base station 1904 may estimate a channel condition for a DL channel (e.g., a channel that is to be used for transmitting data to the UE 1902). In one example, the base station 1904 may estimate the DL channel based on channel reciprocity, where the base station 1904 may be configured to assume that the channel condition for the DL channel and UL channel is to be similar or identical.

At 1910, based on the estimated channel condition, and additionally or optionally based on UE signal-to-interference and noise ratio (SINR) and/or delay spread report, the base station 1904 may determine whether TR is to be applied to one or more DL transmissions, whether to signal TR location if TR is to be applied, and/or whether to leave to the UE 1902 to determine the TR location if TR is to be applied, such as described in connection with FIG. 12.

At 1912, if the base station 1904 determines that TR is to be applied to one or more DL transmissions, the base station 1904 may determine a number of tones (e.g., SCs) that is to be transmitted for the one or more DL transmissions, and a number of tones that are to be designated/allocated as reserved tones. In other words, the base station 1904 may determine a number of tones that are to be used for TR, such as described in connection with FIGS. 12 and 13.

At 1914, based on the determined number of tones that are to be used for TR (e.g., number of reserved tones), the base station 1904 may determine the location of the reserved tones. In one example, as described in connection with FIGS. 12 and 13, the base station 1904 may determine the location of the reserved tones based on the channel condition (e.g., measured energy) of the tones (e.g., associated SCs), where the base station 1904 may allocate the determined number of reserved tones to SCs with smallest energy or lowest SNR.

At 1916, based on the determined TR location, the base station 1904 may calculate the differential TR locations, such as described in connection with FIGS. 13 and 14. For example, any consecutive data tones/SCs or reserved tones/SCs may be represented by bit zero (0), and each reserved tone followed by a data tone or each data tone follow by a reserved tone may be represented by bit one (1) in the differential TR locations.

At 1918, the base station 1904 may prepare UE signaling for indicating whether TR is to be applied to DL transmission(s), whether TR locations is to be estimated by the UE 1902 if TR is to be applied (e.g., maybe there is insufficient overhead for signaling the TR location), and/or the corresponding tone reservation differential locations if TR is to be applied).

At 1920, the base station 1904 may indicate to the UE 1902 whether TR is to be applied or not to be applied, and whether TR locations is to be estimated by the UE 1902 if TR is to be applied.

At 1922, the base station 1904 may transmit the differential index's (e.g., the differential TR) locations, such as described in connection with FIG. 13. In one example, the base statin may include/add a field in the transmission indicating a number of indexes transmitted. In some examples, as described in connection with FIG. 14, the base station 1904 may additionally or optionally compress the differential TR locations, such as by Huffman encoding, run-length encoding, and/or a lossless compression, and the base station 1904 may transmit encoded bits to the UE 1902. In such an example, a predefined look up table (LUT) may be defined at the UE 1902 per delay spread and per TR percentage for the UE to decode the signaling.

Note while the communication flow shows the signaling for whether TR is to be applied (e.g., at 1920) and the signaling for the TR locations (e.g., 1922) as separate signaling, they may be transmitted in one signaling. In some examples, the signaling for whether TR is to be applied and/or the signaling for the TR locations may be carried by downlink control information (DCI), medium access control (MAC)-control element (CE) (MAC-CE), and/or radio resource control (RRC) messages, or any combination of those signaling.

In some examples, the base station 1904 may be configured to transmit TR location indication (e.g., at 1922) with a periodicity or duration to further conserve signal overhead. For example, the base station 1904 may transmit the TR location indication every ten (10) slots, where the TR location may apply to DL transmissions in each ten slots.

At 1924, the base station 1904 may transmit DL transmissions to the UE 1902 based on TR (e.g., based on the indicated TR location indication). In other words, the base station 1904 may insert the optimized tone reservation location and values to the mapper with the data. Then the base station 1904 may continue with the regular OFDM transmission protocol (IFFT, etc.) along with the added signaling. In some examples, as described above, this signaling may be configured not to be transmitted in every slot, such as when no degradation is observed for the channel. This may reduce the signaling (e.g., payload per slot) overhead significantly.

In some examples, if aspects disclosed herein are applied at a UE for UL transmissions to a base station (e.g., the UE performs TR compression/differential signaling for UL transmissions), the base station may signal the UE to use channel null TR along with the locations of those tones (or the UE may report to the gNB the chosen locations). For example, if the UE 1902 is to transmit an UL transmission to the base station 1904 based on TR, the UE 1902 may use the same TR location as used by the base station (e.g., in a previous transmission), the base station 1904 may indicate to the UE 1902 which TR location to use (e.g., if different from the TR location used by the base station 1904), and/or the UE 1902 may determine the TR location itself (e.g., such as based on SCs with lowest SNR or smallest measured energy, etc.) and indicate the TR location to the base station 1904.

At 1926, after the UE 1902 receives signaling/indication from the base station 1904 regarding whether TR is applied to DL transmission(s), whether the UE 1902 is to estimate the location of TR if TR is applied, and/or the TR differential location, etc., the UE 1902 may determine/calculate TR locations for DL transmission(s) based on the TR location indication received from the base station 1904 (e.g., the UE 1902 may decompress the compressed/differential signaling received at 1922), or the UE 1902 may estimate TR location if the UE is configured to determine the location. In some examples, the UE 1902 may receive additional indication if TR locations are signaled. For example, there may be a periodic\aperiodic signaling that may include the TR locations, length of the periodicity, and/or the compressing method used by the base station 1904, etc. Similarly, the UE 1902 may receive the signaling via RRC message, DCI and/or MAC-CE, which may depend on how rapidly the nulls change and the TR percentage—depend on the delay spread.

At 1928, the UE 1902 may receive the DL transmission(s) from the base station 1904 based on the determined/calculated TR locations. For example, the UE 1902 may be configured to decode data tones and skip/ignore reserved tones. In other words, after the UE 1902 knows the location of the tone reservation, the UE 1902 may discard from the data all the SCs that are recognized as tone reservation. Then, the UE 1902 may continue to decode the data.

Figure 20:
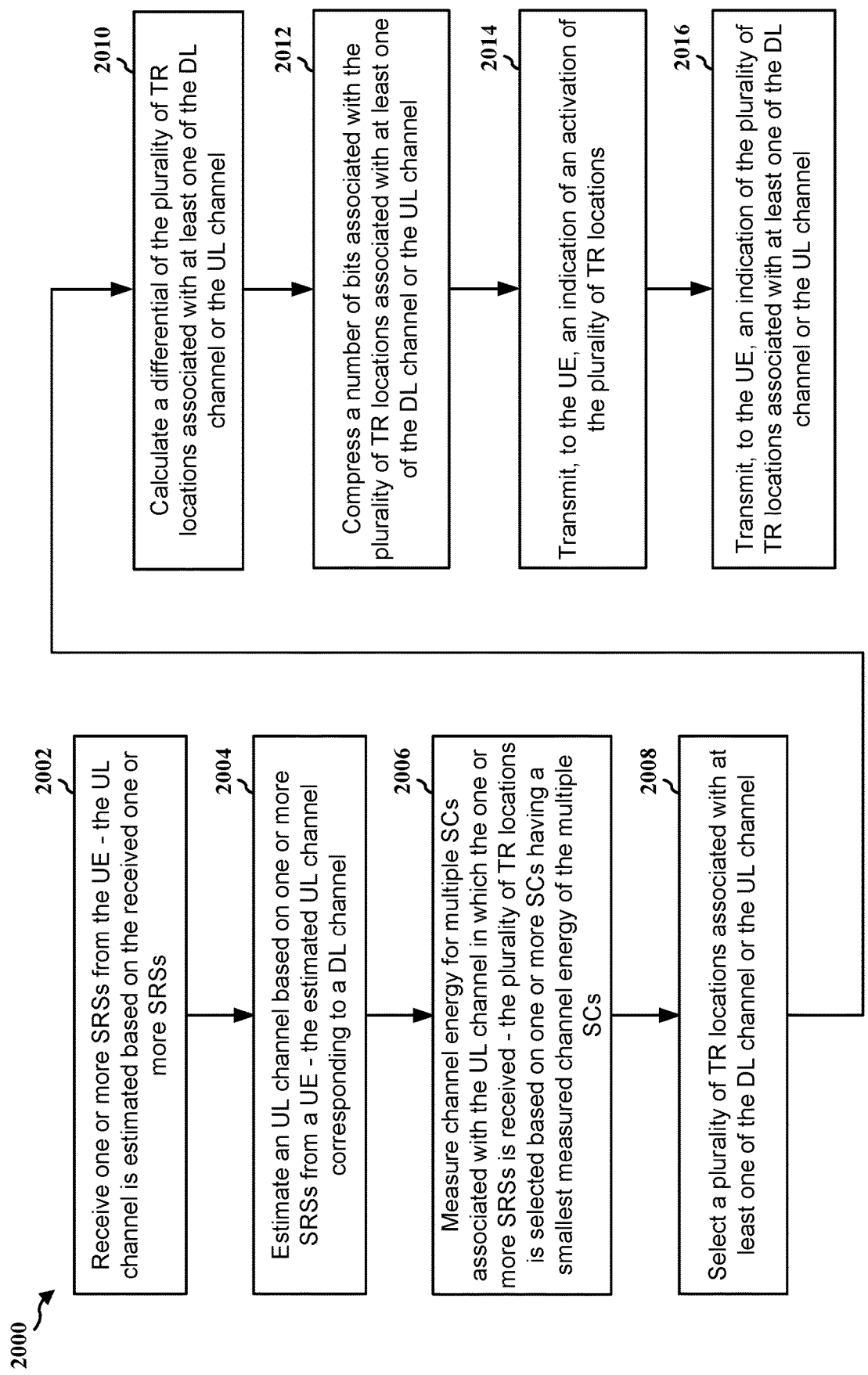
FIG. 20 is a flowchart of a method of wireless communication in accordance with aspects presented herein.

FIG. 20 is a flowchart 2000 of a method of wireless communication. The method may be performed by a base station or a component of a base station (e.g., the base station 102, 220, 310, 1904; the apparatus 2202; a processing system, which may include the memory 376 and which may be the entire base station 310 or a component of the base station 310, such as the TX processor 316 the RX processor 370, and/or the controller/processor 375). The method may enable the base station to compress tone reservation signaling for PAPR reduction, such that base station may indicate to a UE the location of reserved tones and data tones of a transmission with a small payload.

At 2002, the base station may receive the one or more SRSs from the UE, where the UL channel may be estimated based on the received one or more SRSs, such as described in connection with FIG. 19. For example, at 1906, the base station 1904 may receive SRS from the UE 1902. The reception of the SRS may be performed by, e.g., the channel estimation component 2240 and/or the reception component 2230 of the apparatus 2202 in FIG. 22.

At 2004, the base station may estimate an UL channel based on one or more SRSs from a UE, where the estimated UL channel may correspond to a DL channel, such as described in connection with FIG. 19. For example, at 1908, the base station 1904 may estimate DL channel based on channel reciprocity (e.g., based on UL channel). The estimation of the UL channel may be performed by, e.g., the channel estimation component 2240 of the apparatus 2202 in FIG. 22. In one example, the UL channel may correspond to the DL channel based on channel reciprocity.

At 2006, the base station may measure channel energy for multiple SCs associated with the UL channel in which the one or more SRSs is received, where the plurality of TR locations may be selected based on one or more SCs having a smallest measured channel energy or channel capacity of the multiple SCs, such as described in connection with FIGS. 12, 13, and 19. For example, at 1914, the base station 1904 may find the smallest channel energy subcarriers based on the number of tone reservations defined. The measurement of the SCs may be performed by, e.g., the channel estimation component 2240 of the apparatus 2202 in FIG. 22.

At 2008, the base station may select a plurality of TR locations associated with at least one of the DL channel or the UL channel, such as described in connection with FIG. 19. For example, at 1914, the base station 1904 may select a plurality of TR locations associated with the DL channel. The selection of the plurality of TR locations may be performed by, e.g., the TR location determination component 2242 of the apparatus 2202 in FIG. 22. In one example, the plurality of TR locations may correspond to one or more groups of SCs in the multiple SCs.

In another example, the base station may determine whether to select a plurality of TR locations associated with at least one of the DL channel or the UL channel or to transmit the indication of the plurality of TR locations associated with at least one of the DL channel or the UL channel based on at least one of a channel condition, UE SINR, or a delay spread report.

At 2010, the base station may calculate at least one of a differential or a time compression of the plurality of TR locations associated with at least one of the DL channel or the UL channel, such as described in connection with FIG. 19. For example, at 1916, the base station 1904 may calculate the differential tone reservation locations. The calculation of the differential of the plurality of TR locations may be performed by, e.g., the TR differential signaling process component 2244 of the apparatus 2202 in FIG. 22. In one example, consecutive SCs associated with data tones and consecutive SCs associated with reserved tones may be represented by bit zero (0) in a vector, and each reserved tone followed by a data tone and each data tone follow by a reserved tone may be represented by bit one (1) in the vector. In such an example, each of the plurality of TR locations may be associated with a differential signaling.

At 2012, the base station may compress a number of bits associated with the plurality of TR locations associated with at least one of the DL channel or the UL channel, such as described in connection with FIG. 19. For example, the base station 1904 may compress the number of bits associated with the plurality of TR locations. The compression of the number of bits associated with the plurality of TR locations may be performed by, e.g., the TR differential signaling compression component 2246 of the apparatus 2202 in FIG. 22. In one example, the number of bits may correspond to at least one vector, and each of the number of bits may correspond to a data tone or a reserved tone. In another example, the compression may be based on at least one Huffman encoding, run-length encoding, or a lossless compression.

At 2014, the base station may transmit, to the UE, an indication of an activation of the plurality of TR locations, such as described in connection with FIG. 19. For example, at 1920, the base station 1904 may transmit, to the UE 1902, an indication whether TR is to be applied. The indication of the activation of the plurality of TR locations may be performed by, e.g., the TR application indication component 2248 and/or the transmission component 2234 of the apparatus 2202 in FIG. 22.

At 2016, the base station may transmit, to the UE, an indication of the plurality of TR locations associated with at least one of the DL channel or the UL channel, such as described in connection with FIG. 19. For example, at 1922, the base station 1904 may an indication indicating the TR locations associated with the DL transmission(s).

Figure 22:
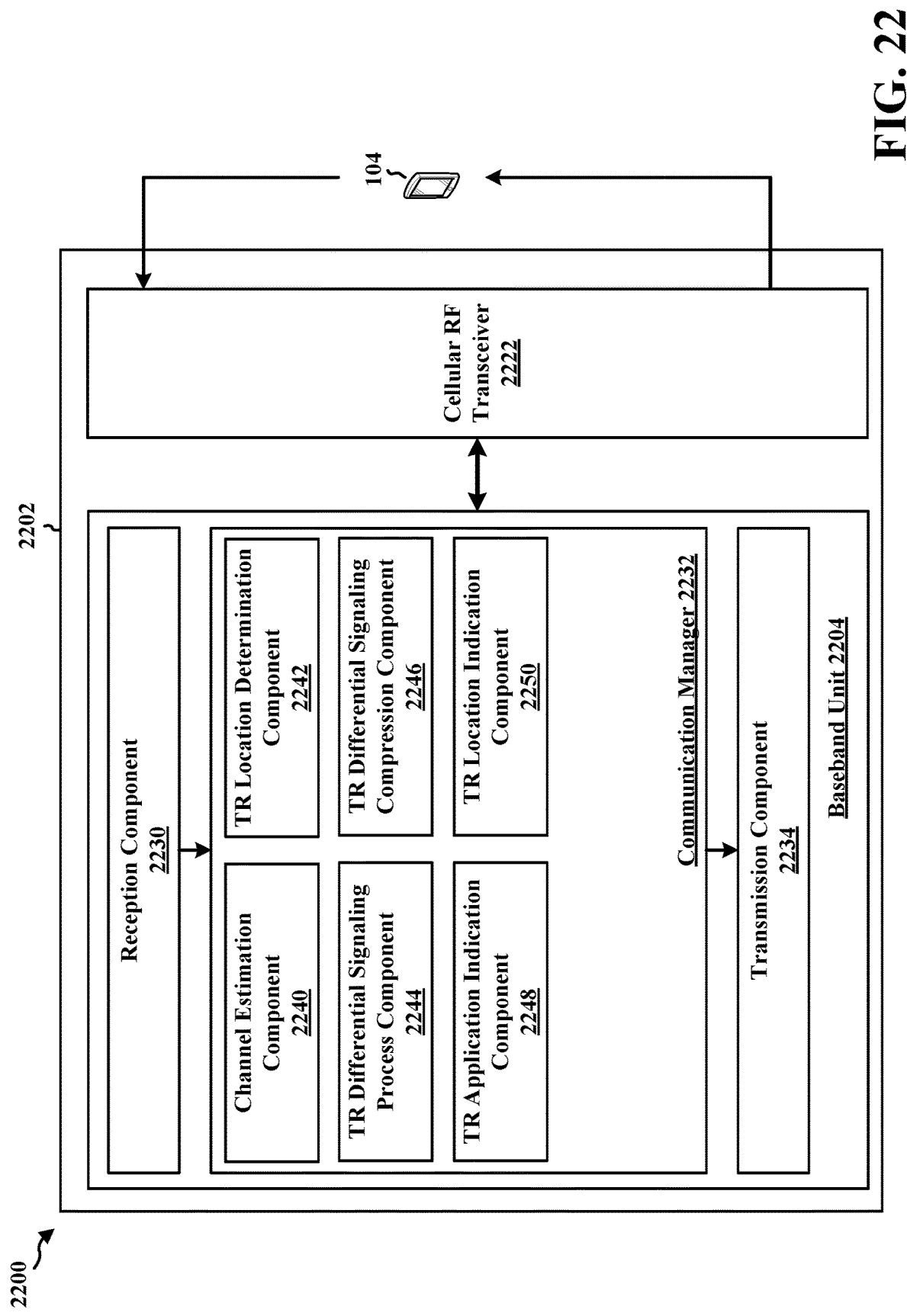
FIG. 22 is a diagram illustrating an example of a hardware implementation for an example apparatus in accordance with aspects presented herein.

The transmission of the indication may be performed by, e.g., the TR location indication component 2250 and/or the transmission component 2234 of the apparatus 2202 in FIG. 22. Then, the base station may transmit one or more DL transmission based on the TR.

In one example, the indication may include locations of differential indices associated with the plurality of TR locations. In another example, the indication may be transmitted via at least one of DCI, a MAC-CE, or RRC signaling.

In another example, the indication of the plurality of TR locations may be transmitted at every X slot, X being an integer greater than one (1).

In another example, the indication of the plurality of TR locations may be transmitted when a degradation in the UL channel or the DL channel is detected.

Figure 21:
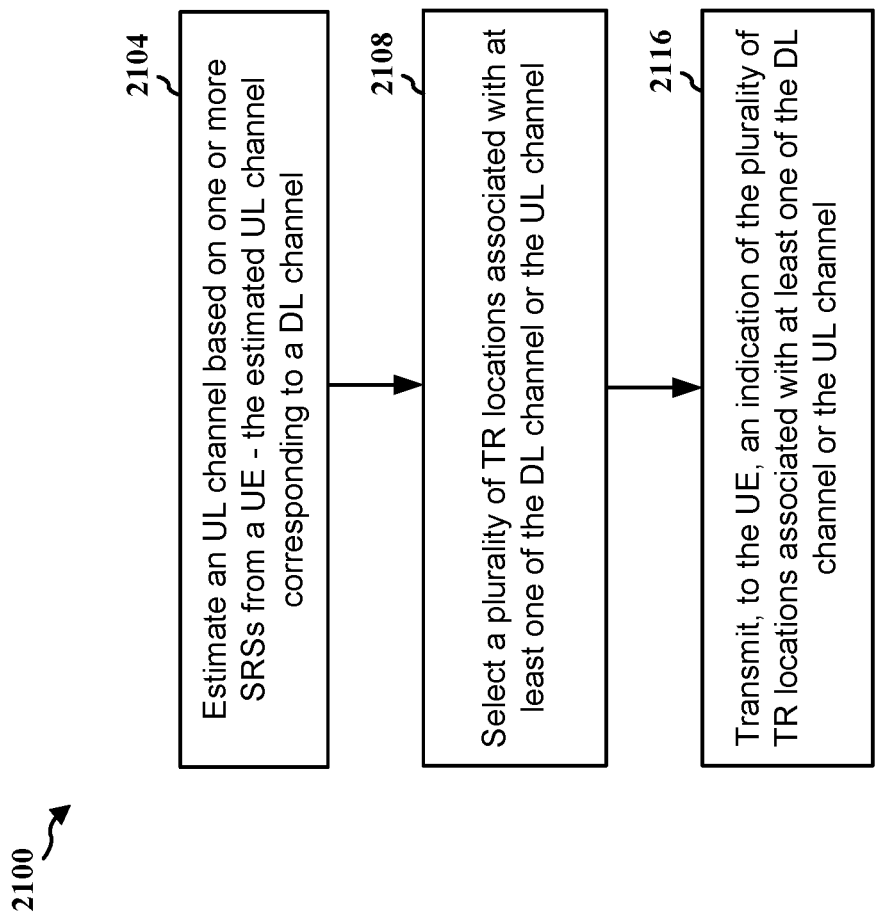
FIG. 21 is a flowchart of a method of wireless communication in accordance with aspects presented herein.

FIG. 21 is a flowchart 2100 of a method of wireless communication. The method may be performed by a base station or a component of a base station (e.g., the base station 102, 220, 310, 1904; the apparatus 2202; a processing system, which may include the memory 376 and which may be the entire base station 310 or a component of the base station 310, such as the TX processor 316 the RX processor 370, and/or the controller/processor 375). The method may enable the base station to compress tone reservation signaling for PAPR reduction, such that base station may indicate to a UE the location of reserved tones and data tones of a transmission with a small payload.

At 2104, the base station may estimate an UL channel based on one or more SRSs from a UE, where the estimated UL channel may correspond to a DL channel, such as described in connection with FIG. 19. For example, at 1908, the base station 1904 may estimate DL channel based on channel reciprocity (e.g., based on UL channel). The estimation of the UL channel may be performed by, e.g., the channel estimation component 2240 of the apparatus 2202 in FIG. 22. In one example, the UL channel may correspond to the DL channel based on channel reciprocity.

In one example, the base station may receive the one or more SRSs from the UE, where the UL channel may be estimated based on the received one or more SRSs, such as described in connection with FIG. 19. For example, at 1906, the base station 1904 may receive SRS from the UE 1902. The reception of the SRS may be performed by, e.g., the channel estimation component 2240 and/or the reception component 2230 of the apparatus 2202 in FIG. 22.

In another example, the base station may measure channel energy for multiple SCs associated with the UL channel in which the one or more SRSs is received, where the plurality of TR locations may be selected based on one or more SCs having a smallest measured channel energy or channel capacity of the multiple SCs, such as described in connection with FIGS. 12, 13, and 19. For example, at 1914, the base station 1904 may find the smallest channel energy subcarriers based on the number of tone reservations defined. The measurement of the SCs may be performed by, e.g., the channel estimation component 2240 of the apparatus 2202 in FIG. 22.

At 2108, the base station may select a plurality of TR locations associated with at least one of the DL channel or the UL channel, such as described in connection with FIG. 19. For example, at 1914, the base station 1904 may select a plurality of TR locations associated with the DL channel. The selection of the plurality of TR locations may be performed by, e.g., the TR location determination component 2242 of the apparatus 2202 in FIG. 22. In one example, the plurality of TR locations may correspond to one or more groups of SCs in the multiple SCs.

In another example, the base station may determine whether to select a plurality of TR locations associated with at least one of the DL channel or the UL channel or to transmit the indication of the plurality of TR locations associated with at least one of the DL channel or the UL channel based on at least one of a channel condition, UE SINR, or a delay spread report.

In another example, the base station may calculate at least one of a differential or a time compression of the plurality of TR locations associated with at least one of the DL channel or the UL channel, such as described in connection with FIG. 19. For example, at 1916, the base station 1904 may calculate the differential tone reservation locations. The calculation of the differential of the plurality of TR locations may be performed by, e.g., the TR differential signaling process component 2244 of the apparatus 2202 in FIG. 22. In one example, consecutive SCs associated with data tones and consecutive SCs associated with reserved tones may be represented by bit zero (0) in a vector, and each reserved tone followed by a data tone and each data tone follow by a reserved tone may be represented by bit one (1) in the vector. In such an example, each of the plurality of TR locations may be associated with a differential signaling.

In another example, the base station may compress a number of bits associated with the plurality of TR locations associated with at least one of the DL channel or the UL channel, such as described in connection with FIG. 19. For example, the base station 1904 may compress the number of bits associated with the plurality of TR locations. The compression of the number of bits associated with the plurality of TR locations may be performed by, e.g., the TR differential signaling compression component 2246 of the apparatus 2202 in FIG. 22. In one example, the number of bits may correspond to at least one vector, and each of the number of bits may correspond to a data tone or a reserved tone. In another example, the compression may be based on at least one Huffman encoding, run-length encoding, or a lossless compression.

In another example, the base station may transmit, to the UE, an indication of an activation of the plurality of TR locations, such as described in connection with FIG. 19. For example, at 1920, the base station 1904 may transmit, to the UE 1902, an indication whether TR is to be applied. The indication of the activation of the plurality of TR locations may be performed by, e.g., the TR application indication component 2248 and/or the transmission component 2234 of the apparatus 2202 in FIG. 22.

At 2116, the base station may transmit, to the UE, an indication of the plurality of TR locations associated with at least one of the DL channel or the UL channel, such as described in connection with FIG. 19. For example, at 1922, the base station 1904 may an indication indicating the TR locations associated with the DL transmission(s). The transmission of the indication may be performed by, e.g., the TR location indication component 2250 and/or the transmission component 2234 of the apparatus 2202 in FIG. 22. Then, the base station may transmit one or more DL transmission based on the TR.

In one example, the indication may include locations of differential indices associated with the plurality of TR locations. In another example, the indication may be transmitted via at least one of DCI, a MAC-CE, or RRC signaling.

In another example, the indication of the plurality of TR locations may be transmitted at every X slot, X being an integer greater than one (1).

In another example, the indication of the plurality of TR locations may be transmitted when a degradation in the UL channel or the DL channel is detected.

FIG. 22 is a diagram 2200 illustrating an example of a hardware implementation for an apparatus 2202. The apparatus 2202 may be a base station, a component of a base station, or may implement base station functionality. In some aspects, the apparatus 2202 may include a baseband unit 2204. The baseband unit 2204 may communicate through a cellular RF transceiver 2222 with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the base station 310 and may include the memory 376 and/or at least one of the TX processor 316, the RX processor 370, and the controller/processor 375.

The communication manager 2232 includes a channel estimation component 2240 that estimates an UL channel based on one or more SRSs from a UE, the estimated UL channel corresponding to a DL channel, e.g., as described in connection with 2004 of FIG. 20 and/or 2104 of FIG. 21. The communication manager 2232 further includes a TR location determination component 2242 that selects a plurality of TR locations associated with at least one of the DL channel or the UL channel, e.g., as described in connection with 2008 of FIG. 20 and/or 2108 of FIG. 21. The communication manager 2232 further includes a TR differential signaling process component 2244 that calculates at least one of a differential or a time compression of the plurality of TR locations associated with at least one of the DL channel or the UL channel, e.g., as described in connection with 2010 of FIG. 20. The communication manager 2232 further includes a TR differential signaling compression component 2246 that compresses a number of bits associated with the plurality of TR locations associated with at least one of the DL channel or the UL channel, e.g., as described in connection with 2012 of FIG. 20. The communication manager 2232 further includes a TR application indication component 2248 that transmits, to the UE, an indication of an activation of the plurality of TR locations, e.g., as described in connection with 2014 of FIG. 20. The communication manager 2232 further includes a TR location indication component 2250 that transmits, to the UE, an indication of the plurality of TR locations associated with at least one of the DL channel or the UL channel, e.g., as described in connection with 2016 of FIG. 20 and/or 2116 of FIG. 21.

The apparatus may include additional components that perform each of the blocks of the algorithm in the flowcharts of FIGS. 20 and 21. As such, each block in the flowcharts of FIGS. 20 and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the baseband unit 2204, includes means for receiving the one or more SRSs from the UE, where the UL channel may be estimated based on the received one or more SRSs (e.g., the channel estimation component 2240 and/or the reception component 2230). The apparatus 2002 includes means for estimating an UL channel based on one or more SRSs from a UE, where the estimated UL channel may correspond to a DL channel (e.g., the channel estimation component 2240). The apparatus 2002 includes means for measuring channel energy for multiple SCs associated with the UL channel in which the one or more SRSs is received, where the plurality of TR locations may be selected based on one or more SCs having a smallest measured channel energy or channel capacity of the multiple SCs (e.g., the channel estimation component 2240). The apparatus 2002 includes means for selecting a plurality of TR locations associated with at least one of the DL channel or the UL channel (e.g., the TR location determination component 2242). The apparatus 2002 includes means for calculating at least one of a differential or a time compression of the plurality of TR locations associated with at least one of the DL channel or the UL channel (e.g., the TR differential signaling process component 2244). The apparatus 2002 includes means for compressing a number of bits associated with the plurality of TR locations associated with at least one of the DL channel or the UL channel (e.g., the TR differential signaling compression component 2246). The apparatus 2002 includes means for transmitting, to the UE, an indication of an activation of the plurality of TR locations (e.g., the TR application indication component 2248 and/or the transmission component 2234). The apparatus 2002 includes means for transmitting, to the UE, an indication of the plurality of TR locations associated with at least one of the DL channel or the UL channel (e.g., the TR location indication component 2250 and/or the transmission component 2234).

In one configuration, the UL channel may correspond to the DL channel based on channel reciprocity.

In another configuration, the plurality of TR locations may correspond to one or more groups of SCs in the multiple SCs.

In another configuration, the base station may determine whether to select a plurality of TR locations associated with at least one of the DL channel or the UL channel or to transmit the indication of the plurality of TR locations associated with at least one of the DL channel or the UL channel based on at least one of a channel condition, UE SINR, or a delay spread report.

In another configuration, consecutive SCs associated with data tones and consecutive SCs associated with reserved tones may be represented by bit zero (0) in a vector, and each reserved tone followed by a data tone and each data tone follow by a reserved tone may be represented by bit one (1) in the vector. In such a configuration, each of the plurality of TR locations may be associated with a differential signaling.

In another configuration, the number of bits may correspond to at least one vector, and each of the number of bits may correspond to a data tone or a reserved tone.

In another configuration, the compression may be based on at least one Huffman encoding, run-length encoding, or a lossless compression.

In another configuration, the indication may include locations of differential indices associated with the plurality of TR locations. In another configuration, the indication may be transmitted via at least one of DCI, a MAC-CE, or RRC signaling.

In another configuration, the indication of the plurality of TR locations may be transmitted at every X slot, X being an integer greater than one (1).

In another configuration, the indication of the plurality of TR locations may be transmitted when a degradation in the UL channel or the DL channel is detected.

The means may be one or more of the components of the apparatus 2202 configured to perform the functions recited by the means. As described supra, the apparatus 2202 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 23:
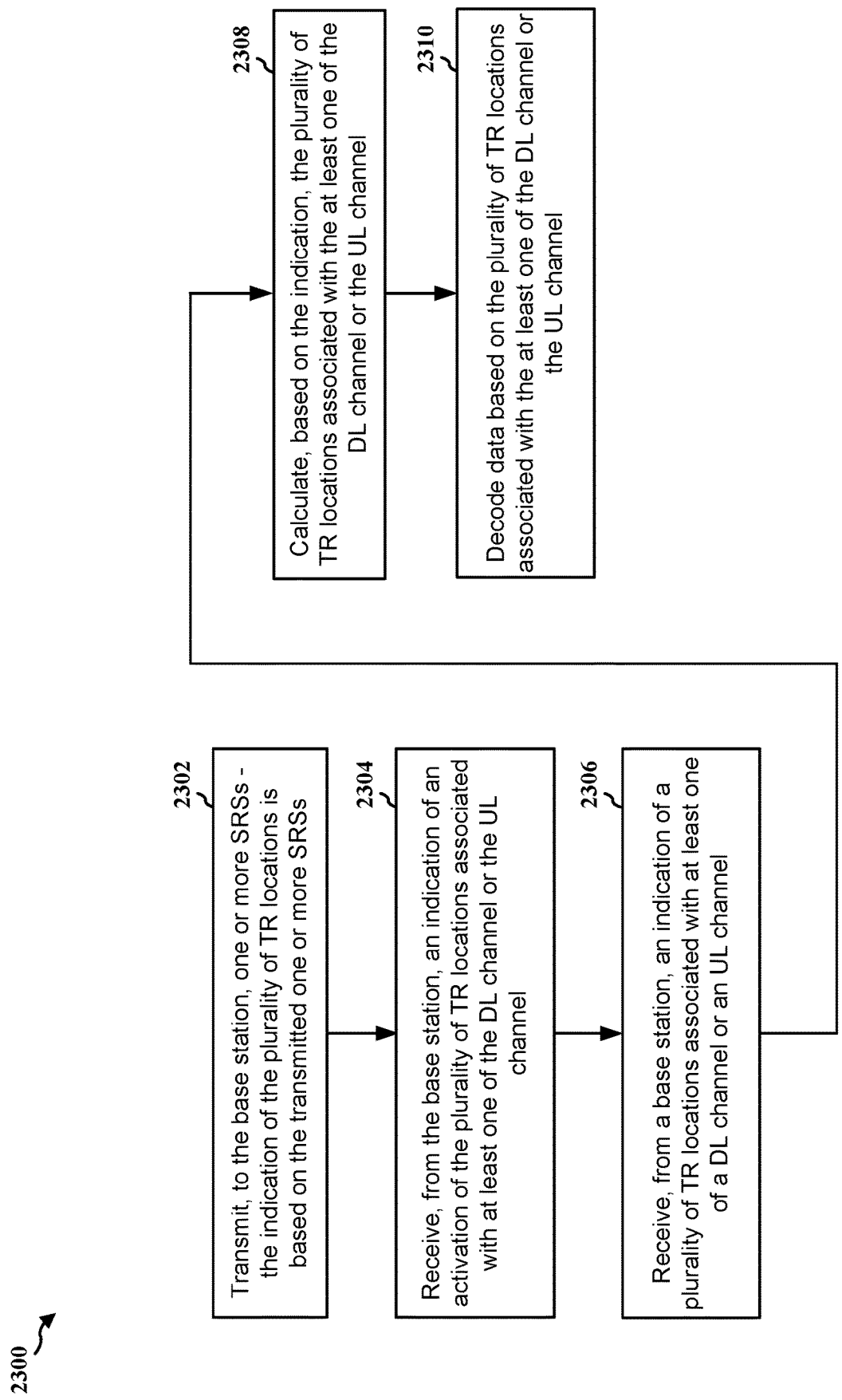
FIG. 23 is a flowchart of a method of wireless communication in accordance with aspects presented herein.

FIG. 23 is a flowchart 2300 of a method of wireless communication. The method may be performed by a UE or a component of a UE (e.g., the UE 104, 350, 1902; the apparatus 2502; a processing system, which may include the memory 360 and which may be the entire UE 350 or a component of the UE 350, such as the TX processor 368, the RX processor 356, and/or the controller/processor 359). The method may enable a UE to receive compressed tone reservation signaling from a base station, and to monitor/decode transmission from the base station based on the tone reservation.

At 2302, the UE may transmit, to the base station, one or more SRSs, where the indication of the plurality of TR locations is based on the transmitted one or more SRSs, such as described in connection with FIG. 19. For example, at 1906, the UE 1902 may transmit one or more SRSs to the base station 1904. The transmission of the SRS may be performed by, e.g., the SRS process component 2540 and/or the transmission component 2534 of the apparatus 2502 in FIG. 25.

At 2304, the UE may receive, from the base station, an indication of an activation of the plurality of TR locations associated with at least one of the DL channel or the UL channel, such as described in connection with FIG. 19. For example, at 1920, the UE 1902 may receive an indication from the base station 1904 indicating whether TR is to be applied to one or more DL transmissions. The reception of the indication of an activation of the plurality of TR locations may be performed by, e.g., the TR activation process component 2542 and/or the reception component 2530 of the apparatus 2502 in FIG. 25.

In one example, the UE may estimate the plurality of TR locations associated with the at least one of the DL channel or the UL channel.

At 2306, the UE may receive, from a base station, an indication of a plurality of TR locations associated with at least one of a DL channel or an UL channel, such as described in connection with FIG. 19. For example, at 1922, the UE 1902 may receive an indication from the base station 1904 indicating the location of TR. The reception of the indication of the plurality of TR locations may be performed by, e.g., the TR location calculation component 2544 and/or the reception component 2530 of the apparatus 2502 in FIG. 25.

In one example, the indication may include locations of differential indices associated with the plurality of TR locations.

In another example, the indication may be received via at least one of DCI, a MAC-CE, or RRC signaling.

In another example, the indication of the plurality of TR locations is received at every X slot, X being an integer greater than one (1).

At 2308, the UE may calculate, based on the indication, the plurality of TR locations associated with the at least one of the DL channel or the UL channel, such as described in connection with FIG. 19. For example, at 1926, the UE 1902 may calculate the TR locations based on the received TR location indication. The calculation of the plurality of TR locations may be performed by, e.g., the TR location calculation component 2544 of the apparatus 2502 in FIG. 25.

In one example, the calculation of the plurality of TR locations associated with the at least one of the DL channel or the UL channel may be based on the indication of the activation of the plurality of TR locations associated with at least one of the DL channel or the UL channel.

At 2310, the UE may decode data based on the plurality of TR locations associated with the at least one of the DL channel or the UL channel, such as described in connection with FIG. 19. For example, at 1928, the UE 1902 may decode data based on TR. The decoding of data may be performed by, e.g., the TR decoding component 2546 and/or the reception component 2530 of the apparatus 2502 in FIG. 25.

In one example, the UE may discard the plurality of TR locations or puncture one or more SCs corresponding to the plurality of TR locations. In another example, the UE may discard one or more SCs from the data that corresponds to a tone reservation. In another example, the UE may skip decoding of one or more SCs from the data that corresponds to a tone reservation.

In another example, the UE may configure an UL channel associated with the plurality of TR locations associated with at least one of the DL channel or the UL channel.

Figure 24:
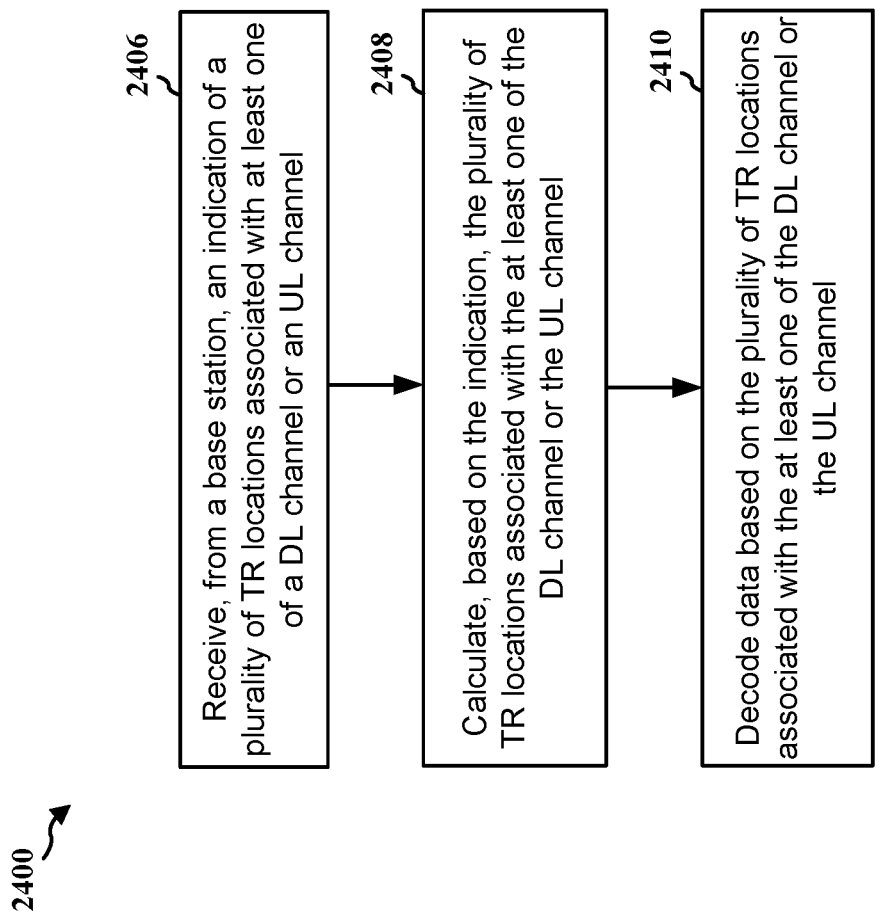
FIG. 24 is a flowchart of a method of wireless communication in accordance with aspects presented herein.

FIG. 24 is a flowchart 2400 of a method of wireless communication. The method may be performed by a UE or a component of a UE (e.g., the UE 104, 350, 1902; the apparatus 2502; a processing system, which may include the memory 360 and which may be the entire UE 350 or a component of the UE 350, such as the TX processor 368, the RX processor 356, and/or the controller/processor 359). The method may enable a UE to receive compressed tone reservation signaling from a base station, and to monitor/decode transmission from the base station based on the tone reservation.

At 2406, the UE may receive, from a base station, an indication of a plurality of TR locations associated with at least one of a DL channel or an UL channel, such as described in connection with FIG. 19. For example, at 1922, the UE 1902 may receive an indication from the base station 1904 indicating the location of TR. The reception of the indication of the plurality of TR locations may be performed by, e.g., the TR location calculation component 2544 and/or the reception component 2530 of the apparatus 2502 in FIG. 25.

In one example, the UE may transmit, to the base station, one or more SRSs, where the indication of the plurality of TR locations is based on the transmitted one or more SRSs, such as described in connection with FIG. 19. For example, at 1906, the UE 1902 may transmit one or more SRSs to the base station 1904. The transmission of the SRS may be performed by, e.g., the SRS process component 2540 and/or the transmission component 2534 of the apparatus 2502 in FIG. 25.

In another example, the UE may receive, from the base station, an indication of an activation of the plurality of TR locations associated with at least one of the DL channel or the UL channel, such as described in connection with FIG. 19. For example, at 1920, the UE 1902 may receive an indication from the base station 1904 indicating whether TR is to be applied to one or more DL transmissions. The reception of the indication of an activation of the plurality of TR locations may be performed by, e.g., the TR activation process component 2542 and/or the reception component 2530 of the apparatus 2502 in FIG. 25.

In another example, the UE may estimate the plurality of TR locations associated with the at least one of the DL channel or the UL channel.

In another example, the indication may include locations of differential indices associated with the plurality of TR locations.

In another example, the indication may be received via at least one of DCI, a MAC-CE, or RRC signaling.

In another example, the indication of the plurality of TR locations is received at every X slot, X being an integer greater than one (1).

At 2408, the UE may calculate, based on the indication, the plurality of TR locations associated with the at least one of the DL channel or the UL channel, such as described in connection with FIG. 19. For example, at 1926, the UE 1902 may calculate the TR locations based on the received TR location indication. The calculation of the plurality of TR locations may be performed by, e.g., the TR location calculation component 2544 of the apparatus 2502 in FIG. 25.

In one example, the calculation of the plurality of TR locations associated with the at least one of the DL channel or the UL channel may be based on the indication of the activation of the plurality of TR locations associated with at least one of the DL channel or the UL channel.

At 2410, the UE may decode data based on the plurality of TR locations associated with the at least one of the DL channel or the UL channel, such as described in connection with FIG. 19. For example, at 1928, the UE 1902 may decode data based on TR. The decoding of data may be performed by, e.g., the TR decoding component 2546 and/or the reception component 2530 of the apparatus 2502 in FIG. 25.

In one example, the UE may discard the plurality of TR locations or puncture one or more SCs corresponding to the plurality of TR locations. In another example, the UE may discard one or more SCs from the data that corresponds to a tone reservation. In another example, the UE may skip decoding of one or more SCs from the data that corresponds to a tone reservation.

In another example, the UE may configure an UL channel associated with the plurality of TR locations associated with at least one of the DL channel or the UL channel.

Figure 25:
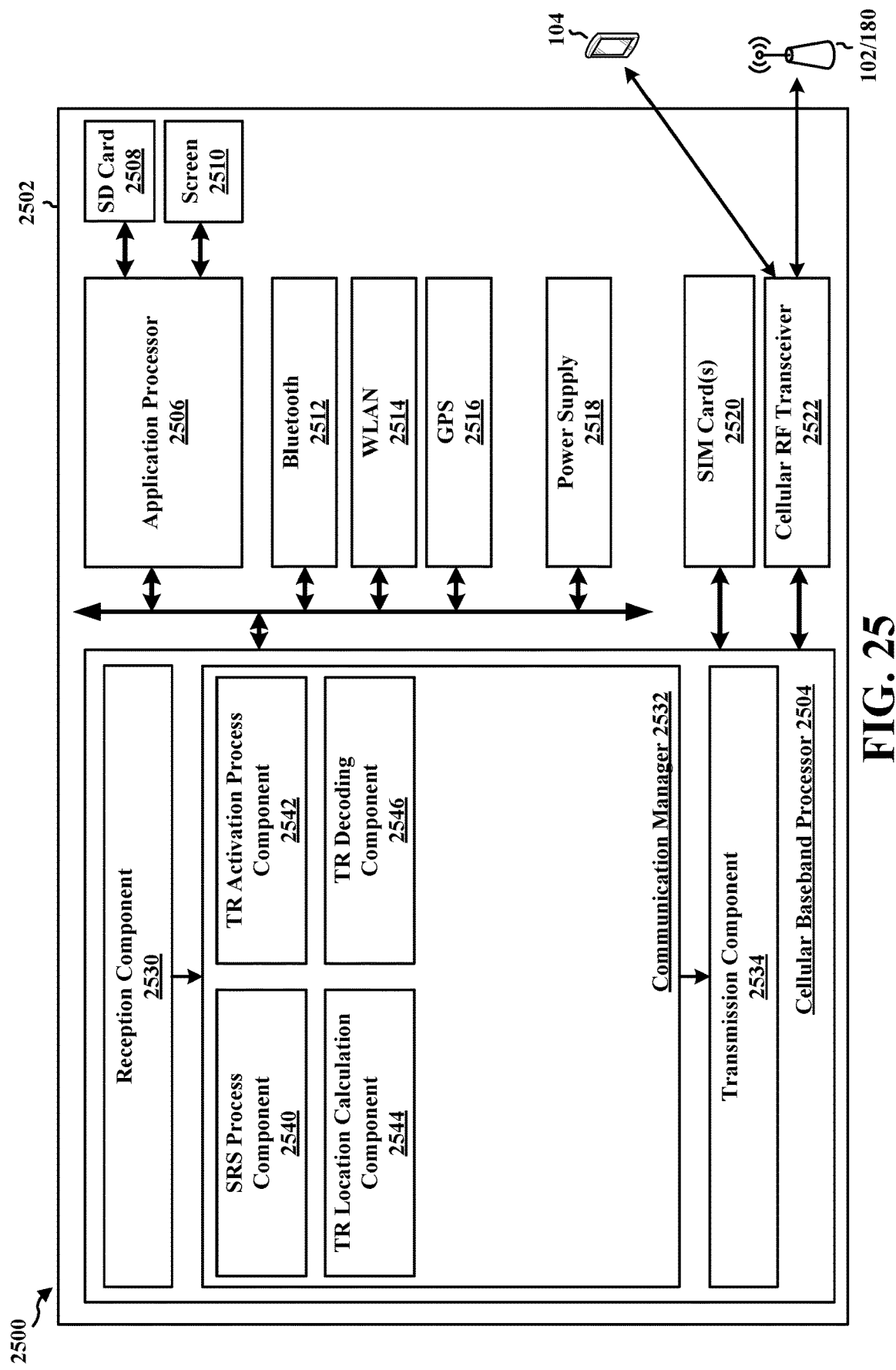
FIG. 25 is a diagram illustrating an example of a hardware implementation for an example apparatus in accordance with aspects presented herein.

FIG. 25 is a diagram 2500 illustrating an example of a hardware implementation for an apparatus 2502. The apparatus 2502 may be a UE, a component of a UE, or may implement UE functionality. In some aspects, the apparatus 2502 may include a cellular baseband processor 2504 (also referred to as a modem) coupled to a cellular RF transceiver 2522. In some aspects, the apparatus 2502 may further include one or more subscriber identity modules (SIM) cards 2520, an application processor 2506 coupled to a secure digital (SD) card 2508 and a screen 2510, a Bluetooth module 2512, a wireless local area network (WLAN) module 2514, a Global Positioning System (GPS) module 2516, or a power supply 2518. The cellular baseband processor 2504 communicates through the cellular RF transceiver 2522 with the UE 104 and/or BS 102/220. The cellular baseband processor 2504 may include a computer-readable medium/memory. The computer-readable medium/memory may be non-transitory. The cellular baseband processor 2504 is responsible for general processing, including the execution of software stored on the computer-readable medium/memory. The software, when executed by the cellular baseband processor 2504, causes the cellular baseband processor 2504 to perform the various functions described supra. The computer-readable medium/memory may also be used for storing data that is manipulated by the cellular baseband processor 2504 when executing software. The cellular baseband processor 2504 further includes a reception component 2530, a communication manager 2532, and a transmission component 2534. The communication manager 2532 includes the one or more illustrated components. The components within the communication manager 2532 may be stored in the computer-readable medium/memory and/or configured as hardware within the cellular baseband processor 2504. The cellular baseband processor 2504 may be a component of the UE 350 and may include the memory 360 and/or at least one of the TX processor 368, the RX processor 356, and the controller/processor 359. In one configuration, the apparatus 2502 may be a modem chip and include just the baseband processor 2504, and in another configuration, the apparatus 2502 may be the entire UE (e.g., see 350 of FIG. 3) and include the additional modules of the apparatus 2502.

The communication manager 2532 includes an SRS process component 2540 that is configured to transmit, to the base station, one or more SRSs, where the indication of the plurality of TR locations is based on the transmitted one or more SRSs, e.g., as described in connection with 2302 of FIG. 23. The communication manager 2532 further includes a TR activation process component 2542 that is configured to receive, from the base station, an indication of an activation of the plurality of TR locations associated with at least one of the DL channel or the UL channel, e.g., as described in connection with 2304 of FIG. 23. The communication manager 2532 further includes a TR location calculation component 2544 that is configured to receive, from a base station, an indication of a plurality of TR locations associated with at least one of a DL channel or an UL channel, and/or calculate, based on the indication, the plurality of TR locations associated with the at least one of the DL channel or the UL channel, e.g., as described in connection with 2306, 2308 of FIG. 23 and/or 2406, 2408 of FIG. 24. The communication manager 2532 further includes a TR decoding component 2546 that is configured to decode data based on the plurality of TR locations associated with the at least one of the DL channel or the UL channel, e.g., as described in connection with 2310 of FIG. 23 and/or 2410 of FIG. 24.

The apparatus may include additional components that perform each of the blocks of the algorithm in the flowcharts of FIGS. 23 and 24. As such, each block in the flowcharts of FIGS. 23 and 24 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2502 may include a variety of components configured for various functions. In one configuration, the apparatus 2502, and in particular the cellular baseband processor 2504, includes means for transmitting, to the base station, one or more SRSs, where the indication of the plurality of TR locations is based on the transmitted one or more SRSs (e.g., the SRS process component 2540 and/or the transmission component 2534). The apparatus 2502 includes means for receiving, from the base station, an indication of an activation of the plurality of TR locations associated with at least one of the DL channel or the UL channel (e.g., the TR activation process component 2542 and/or the reception component 2530). The apparatus 2502 includes means for receiving, from a base station, an indication of a plurality of TR locations associated with at least one of a DL channel or an UL channel (e.g., the TR location calculation component 2544 and/or the reception component 2530). The apparatus 2502 includes means for calculating, based on the indication, the plurality of TR locations associated with the at least one of the DL channel or the UL channel (e.g., the channel condition measurement component 2542). The apparatus 2502 includes means for decoding data based on the plurality of TR locations associated with the at least one of the DL channel or the UL channel (e.g., the TR decoding component 2546 and/or the reception component 2530).

In one configuration, the apparatus 2502 includes means for estimating the plurality of TR locations associated with the at least one of the DL channel or the UL channel.

In another configuration, the indication may include locations of differential indices associated with the plurality of TR locations.

In another configuration, the indication may be received via at least one of DCI, a MAC-CE, or RRC signaling.

In another configuration, the indication of the plurality of TR locations is received at every X slot, X being an integer greater than one (1).

In another configuration, the calculation of the plurality of TR locations associated with the at least one of the DL channel or the UL channel may be based on the indication of the activation of the plurality of TR locations associated with at least one of the DL channel or the UL channel.

In another configuration, the apparatus 2502 includes means for discarding the plurality of TR locations or puncture one or more SCs corresponding to the plurality of TR locations.

In another configuration, the apparatus 2502 includes means for discarding one or more SCs from the data that corresponds to a tone reservation.

In another configuration, the apparatus 2502 includes means for skipping decoding of one or more SCs from the data that corresponds to a tone reservation.

In another configuration, the apparatus 2502 includes means for configuring an UL channel associated with the plurality of TR locations associated with at least one of the DL channel or the UL channel.

The means may be one or more of the components of the apparatus 2502 configured to perform the functions recited by the means. As described supra, the apparatus 2502 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to estimate an UL channel based on based on one or more SRSs from a UE, the estimated UL channel corresponding to a DL channel; select a plurality of TR locations associated with at least one of the DL channel or the UL channel; and transmit, to the UE, an indication of the plurality of TR locations associated with at least one of the DL channel or the UL channel.

Aspect 2 is the apparatus of aspect 1, further including a transceiver coupled to the at least one processor.

Aspect 3 is the apparatus of any of aspects 1 and 2, where the UL channel corresponds to the DL channel based on channel reciprocity.

Aspect 4 is the apparatus of any of aspects 1 to 3, where the at least one processor is further configured to: receive the one or more SRSs from the UE, where the UL channel is estimated based on the received one or more SRSs.

Aspect 5 is the apparatus of any of aspects 1 to 4, where to estimate the UL channel based on the one or more SRSs from the UE, the at least one processor is further configured to: measure channel energy for multiple SCs associated with the UL channel in which the one or more SRSs is received, where the plurality of TR locations is selected based on one or more SCs having a smallest measured channel energy or channel capacity of the multiple SCs.

Aspect 6 is the apparatus of any of aspects 1 to 5, where the plurality of TR locations corresponds to one or more groups of SCs in the multiple SCs.

Aspect 7 is the apparatus of any of aspects 1 to 6, where the at least one processor is further configured to:

calculate at least one of a differential or a time compression of the plurality of TR locations associated with at least one of the DL channel or the UL channel.

Aspect 8 is the apparatus of any of aspects 1 to 7, where consecutive SCs associated with data tones and consecutive SCs associated with reserved tones are represented by bit zero (0) in a vector, and each reserved tone followed by a data tone and each data tone follow by a reserved tone is represented by bit one (1) in the vector.

Aspect 9 is the apparatus of any of aspects 1 to 8, where each of the plurality of TR locations is associated with a differential signaling.

Aspect 10 is the apparatus of any of aspects 1 to 9, where the at least one processor is further configured to: determine whether to select a plurality of TR locations associated with at least one of the DL channel or the UL channel or to transmit the indication of the plurality of TR locations associated with at least one of the DL channel or the UL channel based on at least one of a channel condition, UE SINK, or a delay spread report.

Aspect 11 is the apparatus of any of aspects 1 to 10, where the at least one processor is further configured to: compress a number of bits associated with the plurality of TR locations associated with at least one of the DL channel or the UL channel.

Aspect 12 is the apparatus of any of aspects 1 to 11, where the number of bits corresponds to at least one vector, and each of the number of bits correspond to a data tone or a reserved tone.

Aspect 13 is the apparatus of any of aspects 1 to 12, where the compression is based on at least one Huffman encoding, run-length encoding, or a lossless compression.

Aspect 14 is the apparatus of any of aspects 1 to 13, where the at least one processor is further configured to: transmit, to the UE, an indication of an activation of the plurality of TR locations.

Aspect 15 is the apparatus of any of aspects 1 to 14, where the indication includes locations of differential indices associated with the plurality of TR locations.

Aspect 16 is the apparatus of any of aspects 1 to 15, where the indication is transmitted via at least one of DCI, a MAC-CE, or RRC signaling.

Aspect 17 is the apparatus of any of aspects 1 to 16, where the indication of the plurality of TR locations is transmitted at every X slot, X being an integer greater than one (1).

Aspect 18 is the apparatus of any of aspects 1 to 17, where the indication of the plurality of TR locations is transmitted when a degradation in the UL channel or the DL channel is detected.

Aspect 19 is the apparatus of any of aspects 1 to 18, where the apparatus is a base station or a component of a base station.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

Aspect 23 is an apparatus for wireless communication including at least one processor coupled to a memory and configured to receive, from a base station, an indication of a plurality of TR locations associated with at least one of a DL channel or an UL channel; calculate, based on the indication, the plurality of TR locations associated with the at least one of the DL channel or the UL channel; and decode data based on the plurality of TR locations associated with the at least one of the DL channel or the UL channel.

Aspect 24 is the apparatus of aspect 23, further including a transceiver coupled to the at least one processor.

Aspect 25 is the apparatus of any of aspects 23 and 24, where the at least one processor is further configured to: transmit, to the base station, one or more SRSs, where the indication of the plurality of TR locations is based on the transmitted one or more SRS s.

Aspect 26 is the apparatus of any of aspects 23 to 25, where the at least one processor is further configured to: receive, from the base station, an indication of an activation of the plurality of TR locations associated with at least one of the DL channel or the UL channel.

Aspect 27 is the apparatus of any of aspects 23 to 26, where the indication includes locations of differential indices associated with the plurality of TR locations.

Aspect 28 is the apparatus of any of aspects 23 to 27, where the indication is received via at least one of DCI, a MAC-CE, or RRC signaling.

Aspect 29 is the apparatus of any of aspects 23 to 28, where the at least one processor is further configured to: estimate the plurality of TR locations associated with the at least one of the DL channel or the UL channel.

Aspect 30 is the apparatus of any of aspects 23 to 29, where the indication of the plurality of TR locations is received at every X slot, X being an integer greater than one (1).

Aspect 31 is the apparatus of any of aspects 23 to 30, where to decode data based on the plurality of TR locations associated with the at least one of the DL channel or the UL channel, the at least one processor is further configured to: discard the plurality of TR locations or puncture one or more SCs corresponding to the plurality of TR locations.

Aspect 32 is the apparatus of any of aspects 23 to 31, where to decode data based on the plurality of TR locations associated with the at least one of the DL channel or the UL channel, the at least one processor is further configured to: discard one or more SCs from the data that corresponds to a tone reservation.

Aspect 33 is the apparatus of any of aspects 23 to 32, where to decode data based on the plurality of TR locations associated with the at least one of the DL channel or the UL channel, the at least one processor is further configured to: skip decoding of one or more SCs from the data that corresponds to a tone reservation.

Aspect 34 is the apparatus of any of aspects 23 to 33, where the at least one processor is further configured to: configure an UL channel associated with the plurality of TR locations associated with at least one of the DL channel or the UL channel.

Aspect 35 is a method of wireless communication for implementing any of aspects 23 to 34.

Aspect 36 is an apparatus for wireless communication including means for implementing any of aspects 23 to 34.

Aspect 37 is a computer-readable medium storing computer executable code, where the code when executed by a processor causes the processor to implement any of aspects 23 to 34.

What is claimed is:

1. An apparatus for wireless communication at a base station, comprising:
   memory; and
   at least one processor coupled to the memory and configured to:
   estimate an uplink (UL) channel based on a sounding reference signal (SRS) from a user equipment (UE), the estimated UL channel corresponding to a downlink (DL) channel, wherein to estimate the UL channel based on the SRS from the UE, the at least one processor is further configured to measure channel energy for multiple subcarriers (SCs) associated with the UL channel in which the SRS is received;
   select a plurality of tone reservation (TR) locations associated with at least one of the DL channel or the UL channel, wherein the plurality of TR locations are selected based on one or more SCs having a smallest measured channel energy or channel capacity of the multiple SCs; and
   transmit, to the UE, an indication of the plurality of TR locations associated with at least one of the DL channel or the UL channel.

2. The apparatus of claim 1, wherein the UL channel corresponds to the DL channel based on channel reciprocity.

3. The apparatus of claim 1, wherein the at least one processor is further configured to:
   receive the SRS from the UE, wherein the UL channel is estimated based on the received SRS.

4. The apparatus of claim 1, wherein the plurality of TR locations corresponds to one or more groups of SCs in the multiple SCs.

5. The apparatus of claim 1, wherein the at least one processor is further configured to:
   calculate at least one of a differential or a time differential compression of the plurality of TR locations associated with at least one of the DL channel or the UL channel.

6. The apparatus of claim 5, wherein consecutive SCs associated with data tones and consecutive SCs associated with reserved tones are represented by bit zero (0) in a vector, and each reserved tone followed by a data tone and each data tone follow by a reserved tone is represented by bit one (1) in the vector.

7. The apparatus of claim 1, wherein each of the plurality of TR locations is associated with a differential signaling.

8. The apparatus of claim 1, wherein the at least one processor is further configured to:
   determine whether to select a plurality of TR locations associated with at least one of the DL channel or the UL channel or to transmit the indication of the plurality of TR locations associated with at least one of the DL channel or the UL channel based on at least one of a channel condition, UE signal-to-interference and noise ratio (SINR), or a delay spread report.

9. The apparatus of claim 1, wherein the at least one processor is further configured to:
   compress a number of bits associated with the plurality of TR locations associated with at least one of the DL channel or the UL channel.

10. The apparatus of claim 9, wherein the number of bits corresponds to at least one vector, and each of the number of bits correspond to a data tone or a reserved tone.

11. The apparatus of claim 9, wherein the compression is based on at least one Huffman encoding, run-length encoding, or a lossless compression.

12. The apparatus of claim 1, wherein the at least one processor is further configured to:
   transmit, to the UE, an indication of an activation of the plurality of TR locations.

13. The apparatus of claim 1, wherein the indication includes locations of differential indices associated with the plurality of TR locations, wherein the indication is transmitted via at least one of downlink control information (DCI), a medium access control (MAC)-control element (CE) (MAC-CE), or radio resource control (RRC) signaling.

14. The apparatus of claim 1, wherein the indication of the plurality of TR locations is transmitted at every X slot, X being an integer greater than one (1), wherein the indication of the plurality of TR locations is transmitted when a degradation in the UL channel or the DL channel is detected.

15. The apparatus of claim 1, further comprising a transceiver coupled to the at least one processor.

16. A method of wireless communication at a base station, comprising:
   estimating an uplink (UL) channel based on a sounding reference signal (SRS) from a user equipment (UE), the estimated UL channel corresponding to a downlink (DL) channel, wherein said estimating the UL channel based on the SRS from the UE comprises measuring channel energy for multiple subcarriers (SCs) associated with the UL channel in which the SRS is received;
   selecting a plurality of tone reservation (TR) locations associated with at least one of the DL channel or the UL channel, wherein the plurality of TR locations are selected based on one or more SCs having a smallest measured channel energy or channel capacity of the multiple SCs; and
   transmitting, to the UE, an indication of the plurality of TR locations associated with at least one of the DL channel or the UL channel.

17. An apparatus for wireless communication at a user equipment (UE), comprising:
   memory; and
   at least one processor coupled to the memory and configured to:
   receive, from a base station, an indication of a plurality of tone reservation (TR) locations associated with at least one of a downlink (DL) channel or an uplink (UL) channel, wherein the indication of the plurality of TR locations is received at every X slot, X being an integer greater than one (1), wherein the indication of the plurality of TR locations is transmitted by the base station when a degradation in the UL channel or the DL channel is detected;
   calculate, based on the indication, the plurality of TR locations associated with the at least one of the DL channel or the UL channel; and
   decode data based on the plurality of TR locations associated with the at least one of the DL channel or the UL channel.

18. The apparatus of claim 17, wherein the at least one processor is further configured to:
   transmit, to the base station, a sounding reference signal (SRS), wherein the indication of the plurality of TR locations is based on the transmitted SRS.

19. The apparatus of claim 17, wherein the at least one processor is further configured to:
   receive, from the base station, an indication of an activation of the plurality of TR locations associated with at least one of the DL channel or the UL channel.

20. The apparatus of claim 19, wherein the calculation of the plurality of TR locations associated with the at least one of the DL channel or the UL channel is based on the indication of the activation of the plurality of TR locations associated with at least one of the DL channel or the UL channel.

21. The apparatus of claim 17, wherein the indication includes locations of differential indices associated with the plurality of TR locations,, wherein the indication is received via at least one of downlink control information (DCI), a medium access control (MAC)-control element (CE) (MAC-CE), or radio resource control (RRC) signaling.

22. The apparatus of claim 17, wherein the at least one processor is further configured to:
    estimate the plurality of TR locations associated with the at least one of the DL channel or the UL channel.

23. The apparatus of claim 17, wherein to decode data based on the plurality of TR locations associated with the at least one of the DL channel or the UL channel, the at least one processor is further configured to:
    discard the plurality of TR locations or puncture one or more subcarriers (SCs) corresponding to the plurality of TR locations.

24. The apparatus of claim 17, wherein to decode data based on the plurality of TR locations associated with the at least one of the DL channel or the UL channel, the at least one processor is further configured to:
    discard one or more subcarriers (SCs) from the data that corresponds to a tone reservation.

25. The apparatus of claim 17, wherein to decode data based on the plurality of TR locations associated with the at least one of the DL channel or the UL channel, the at least one processor is further configured to:
    skip decoding of one or more subcarriers (SCs) from the data that corresponds to a tone reservation.

26. The apparatus of claim 17, wherein the at least one processor is further configured to:
    configure an UL channel associated with the plurality of TR locations associated with at least one of the DL channel or the UL channel.

27. The apparatus of claim 17, further comprising a transceiver coupled to the at least one processor.

28. A method of wireless communication at a user equipment comprising:
    receiving, from a base station, an indication of a plurality of tone reservation (TR) locations associated with at least one of a downlink (DL) channel or an uplink (UL) channel, wherein the indication of the plurality of TR locations is received at every X slot, X being an integer greater than one (1), wherein the indication of the plurality of TR locations is transmitted by the base station when a degradation in the UL channel or the DL channel is detected;
    calculating, based on the indication, the plurality of TR locations associated with the at least one of the DL channel or the UL channel; and
    decoding data based on the plurality of TR locations associated with the at least one of the DL channel or the UL channel.

\* \* \* \* \*